United States Patent
Kishikawa et al.

(10) Patent No.: US 11,930,021 B2
(45) Date of Patent: Mar. 12, 2024

(54) UNAUTHORIZED FRAME DETECTION DEVICE AND UNAUTHORIZED FRAME DETECTION METHOD

(71) Applicant: Panasonic Intellectual Property Corporation of America, Torrance, CA (US)

(72) Inventors: Takeshi Kishikawa, Osaka (JP); Ryo Hirano, Osaka (JP); Yoshihiro Ujiie, Osaka (JP); Tomoyuki Haga, Nara (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 366 days.

(21) Appl. No.: 17/354,213

(22) Filed: Jun. 22, 2021

(65) Prior Publication Data

US 2021/0314336 A1 Oct. 7, 2021

Related U.S. Application Data

(63) Continuation of application No. PCT/JP2020/024855, filed on Jun. 24, 2020.

(30) Foreign Application Priority Data

Jul. 4, 2019 (WO) .................. PCT/JP2019/026718

(51) Int. Cl.
*H04L 9/40* (2022.01)
*G06F 21/55* (2013.01)
(Continued)

(52) U.S. Cl.
CPC ...... *H04L 63/1416* (2013.01); *H04L 63/1466* (2013.01); *H04L 63/20* (2013.01); *H04L 67/12* (2013.01)

(58) Field of Classification Search
CPC . H04L 63/1416; H04L 63/1466; H04L 63/20; H04L 67/12; H04L 63/1425; H04L 63/1408; H04W 12/12; H04W 4/48
See application file for complete search history.

(56) References Cited

U.S. PATENT DOCUMENTS

| | | | |
|---|---|---|---|
| 9,912,754 B2* | 3/2018 | Wideman | H04L 67/12 |
| 2016/0147702 A1* | 5/2016 | Yajima | G06F 13/4221 |
| | | | 710/105 |

(Continued)

FOREIGN PATENT DOCUMENTS

CN 109843653 6/2019

OTHER PUBLICATIONS

Park et al., "Blocking of unauthorized multicast frame intake into layer 2 network for IPTV," 2007 Asia-Pacific Conference on Communications Year: 2007 | Conference Paper | Publisher: IEEE.*

(Continued)

*Primary Examiner* — Roderick Tolentino
(74) *Attorney, Agent, or Firm* — Greenblum & Bernstein, P.L.C.

(57) ABSTRACT

An unauthorized frame detection device that can keep an unauthorized ECU from spoofing as a legitimate server or client while suppressing an overhead during communication is provided. The unauthorized frame detection device includes a plurality of communication ports corresponding to the respective of networks, a communication controller, and an unauthorized frame detector. The plurality of communication ports are each connected to a corresponding predetermined network among the plurality of networks and each transmit or receive a frame via the predetermined network. The unauthorized frame detector determines whether an identifier of a service, a type of the service, and port information that are each included in the frame match (Continued)

a permission rule set in advance and outputs a result of the determination.

18 Claims, 16 Drawing Sheets

(51) Int. Cl.
*H04L 67/12* (2022.01)
*H04W 4/48* (2018.01)

(56) References Cited

U.S. PATENT DOCUMENTS

| | | | |
|---|---|---|---|
| 2016/0219028 A1* | 7/2016 | Baltes | H04L 63/08 |
| 2016/0308751 A1* | 10/2016 | Rang | H04L 49/351 |
| 2017/0111360 A1* | 4/2017 | Hooda | H04W 12/122 |
| 2017/0353499 A1* | 12/2017 | Huang | G06F 9/45558 |
| 2018/0152315 A1* | 5/2018 | Kurauchi | H04L 12/40 |
| 2019/0281052 A1* | 9/2019 | Lekkas | H04L 9/14 |
| 2019/0379683 A1* | 12/2019 | Overby | H04W 12/122 |
| 2020/0137099 A1 | 4/2020 | Haga et al. | |
| 2020/0389469 A1* | 12/2020 | Litichever | H04W 4/40 |

OTHER PUBLICATIONS

Yang et al., "Study of Members Damage Early-Warning System for Frame Structures Based on Neural Network," 2010 First ACIS International Symposium on Cryptography, and Network Security, Data Mining and Knowledge Discovery, E-Commerce and Its Applications, and Embedded Systems Year: 2010 | Conference Paper | Publis.*

Mar. 25, 2022 Extended European Search Report in counterpart European patent application No. 20835264.1.

"IEEE Standard for Local and metropolitan area networks—Media Access Control (MAC) Security", IEEE Std 802.1 AE™-2018, Sep. 2018, pp. 1-237.

S. Bellovin, "Guidelines for Specifying the Use of IPsec Version 2", Network Working Group, RFC 5406, BCP 146, Best Current Practice, Feb. 2009, pp. 1-13.

International Search Report issued in International Patent Application No. PCT/JP2019/026718, dated Oct. 1, 2019, along with an English translation thereof.

International Search Report issued in International Patent Application No. PCT/JP2020/024855, dated Sep. 15, 2020, along with an English translation thereof.

* cited by examiner

FIG. 3

| | | | |
|---|---|---|---|
| Flags (=0x80) | Reserved (=0) | | |
| Type (=0x01) | Length of Entries Array in Bytes (=16) | | |
| Service ID (=0x1000) | Index 1st options (=0) | Index 2nd options (=0) | # of opt1 (=1) | # of opt2 (=0) |
| Major Version (=0x01) | TTL (=0xFFFFF) | Instance ID (=0x0001) | |
| Minor Version (=0x00000002) | | | |
| | Length of Options Array in Bytes (=12) | | |
| Reserved (=0) | Length (=9) | Type (=0x04) | Reserved (=0) |
| L4-Proto (=0x11) | IPv4 address (=192.168.0.1) | | Port number (=35000) |

Entry: rows 3–5. Option: rows 7–8.

FIG. 6

| Communication port | Key |
|---|---|
| 112 | 0x11111111 |
| 113 | 0x22222222 |
| 114 | 0x33333333 |
| 115 | 0x44444444 |

FIG. 7

| Mode | Vehicle state |
|---|---|
| Normal mode | Traveling state |

FIG. 8

| Service ID | Type | Communication port | Vehicle state |
|---|---|---|---|
| 0x1000 (Steering instruction) | Offer | 115 | Stopped |
| 0x1000 | Find | 112 | Stopped |
| 0x1010 (Steering angle) | Offer | 112 | Always |
| 0x1010 | Find | 115 | Always |
| 0x2000 (Radar information) | Offer | 113 | Always |
| 0x2000 | Find | 112/115 | Always |
| 0x3000 (Camera information) | Offer | 114 | Always |
| 0x3000 | Find | 115 | Always |
| ... | ... | ... | ... |

FIG. 15

| Service ID | Role | Use start condition |
|---|---|---|
| 0x1050 | Server | Stopped |
| 0x2050 | Client | Always |

UNAUTHORIZED FRAME DETECTION DEVICE AND UNAUTHORIZED FRAME DETECTION METHOD

CROSS REFERENCE TO RELATED APPLICATIONS

This is a continuation application of PCT International Application No. PCT/JP2020/024855 filed on Jun. 24, 2020, designating the United States of America, which is based on and claims priority of PCT International Application No. PCT/JP2019/026718 filed on Jul. 4, 2019. The entire disclosures of the above-identified applications, including the specifications, drawings and claims are incorporated herein by reference in their entirety.

FIELD

The present disclosure relates to an unauthorized frame detection device and an unauthorized frame detection method associated with in-vehicle network security technology.

BACKGROUND

Nowadays, many devices called electronic control units (hereinafter, ECUs) are disposed in a system within an automobile. The network that connects these ECUs is called an in-vehicle network.

There are many in-vehicle network standards, and a standard called the Controller Area Network (hereinafter, CAN (registered trademark)) is one of the most widely adopted in-vehicle network standards.

Meanwhile, with the spread of automatic driving or connected cars, in-vehicle network traffic is expected to increase, and in-vehicle Ethernet (registered trademark) is becoming widespread. In the in-vehicle Ethernet, there is an ongoing shift from conventional signal-oriented communication to service-oriented communication, and this can make the development process more efficient. With regard to a method of achieving service-oriented communication, AUTomotive Open System ARchitecture (AUTOSAR) defines Service Oriented Middle WarE Over Internet Protocol (hereinafter, SOME/IP).

In the SOME/IP communication as well, there is a possible threat of a spoofing attack by an unauthorized node, as in the case of the CAN. Some methods that deal with such a threat are disclosed, and these methods prevent the communication carried out by an unauthorized node by using encrypted communication that has been used in conventional IP communication (see, for example, Non Patent Literature 1 and Non Patent Literature 2).

CITATION LIST

Non Patent Literature

NPL 1: RFC5406: Guidelines for Specifying the Use of IPsec Version 2
NPL 2: IEEE 802.1AE: MAC Security

SUMMARY

Technical Problem

However, since the method disclosed in Non Patent Literature 1 or Non Patent Literature 2 uses encrypted communication, this necessitates encryption and decryption processing at a transmitting or receiving node and causes an overhead. Moreover, the above method places great importance on key management, and a key leak can allow a spoofing attack to occur.

Accordingly, the present disclosure provides an unauthorized frame detection device and so on that can keep an unauthorized ECU from spoofing as a legitimate server or client while suppressing an overhead during communication.

Solution to Problem

To solve the above problem, an unauthorized frame detection device according to one aspect of the present disclosure is an unauthorized frame detection device in an in-vehicle network system that includes a plurality of electronic control units and a plurality of networks, and the plurality of electronic control units communicate via the unauthorized frame detection device through service-oriented communication. The unauthorized frame detection device includes: a plurality of communication ports corresponding to the plurality of networks, respectively; a communication controller; and an unauthorized frame detector, wherein the plurality of communication ports are each connected to a predetermined network corresponding thereto among the plurality of networks and each include an interface for transmitting or receiving, via the predetermined network, a frame to or from an electronic control unit, among the plurality of electronic control units, that is connected to the predetermined network, when a communication port among the plurality of communication ports receives a frame, the communication controller performs transfer control of causing the frame to be transmitted from another communication port, among the plurality of communication ports, other than the communication port that has received the frame, and the unauthorized frame detector makes a determination as to whether an identifier of a service included in the frame, a type of the service included in the frame, and port information included in the frame match a permission rule set in advance and outputs a result of the determination, the type of the service indicating whether an electronic control unit, among the plurality of electronic units, that has transmitted the frame is to offer the service or receive the service, the port information serving to identify the communication port that has received the frame.

Advantageous Effects

The present disclosure makes it possible to keep an unauthorized ECU from spoofing as a legitimate server or client while suppressing an overhead during communication.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 3 illustrates an example of a message of SOME/IP SD according to Embodiment 1.

FIG. 6 illustrates an example of a key according to Embodiment 1.

FIG. 7 illustrates an example of a mode and an example of a vehicle state according to Embodiment 1.

FIG. 8 illustrates an example of a permission rule stored in a permission table according to Embodiment 1.

FIG. 15 illustrates an example of a manifest file according to Other Variation (4).

DESCRIPTION OF EMBODIMENTS

Figure 1:
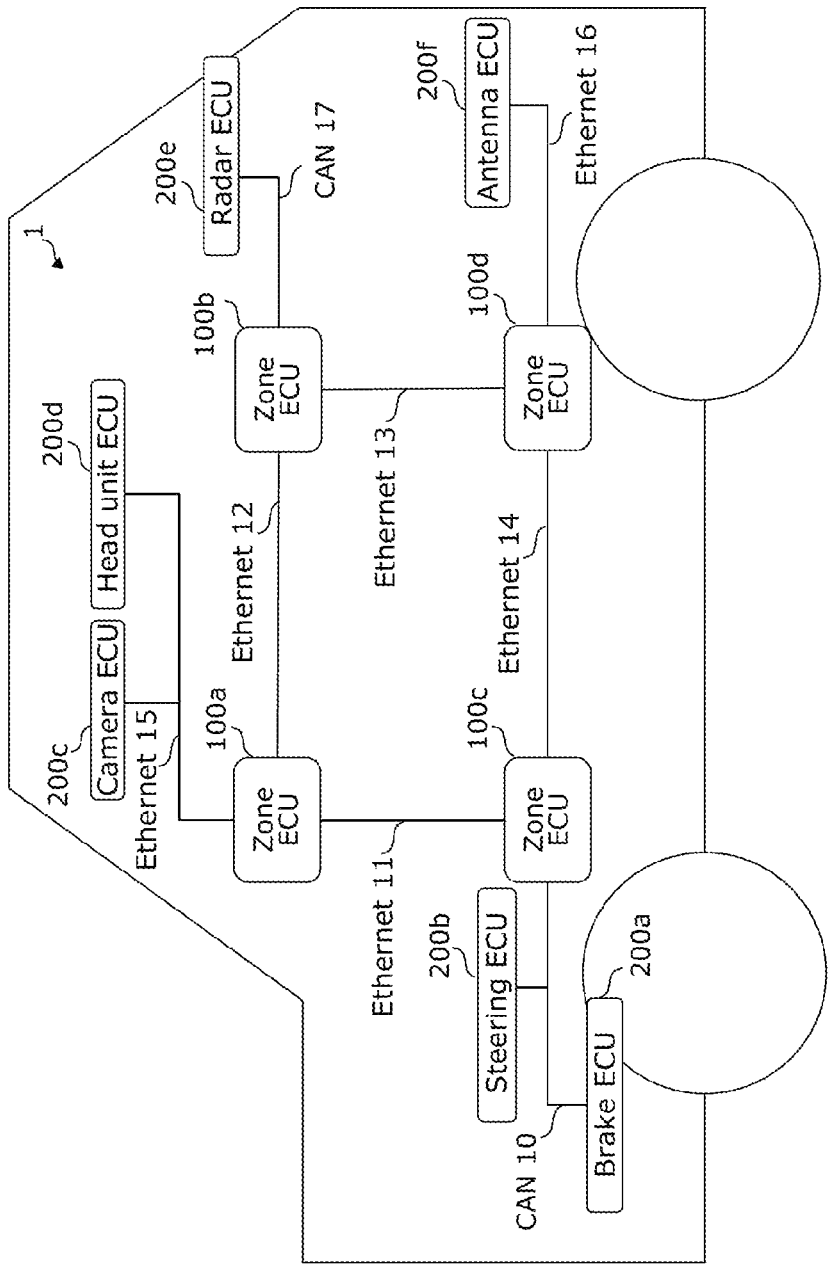
FIG. 1 illustrates an overall configuration of an in-vehicle network system according to Embodiment 1.

An unauthorized frame detection device according to one embodiment of the present disclosure is an unauthorized frame detection device in an in-vehicle network system that includes a plurality of electronic control units and a plurality of networks. The plurality of electronic control units communicate via the unauthorized frame detection device through service-oriented communication. The unauthorized frame detection device includes a plurality of communication ports that correspond to the respective networks, a communication controller, and an unauthorized frame detector. The plurality of communication ports are each connected to a corresponding predetermined network among the plurality of networks and each include an interface for transmitting or receiving, via the predetermined network, a frame to or from an electronic control unit, among the plurality of electronic control units, that is connected to the predetermined network. If a communication port among the plurality of communication ports receives a frame, the communication controller performs transfer control of causing the frame to be transmitted from a communication port, among the plurality of communication ports, other than the communication port that has received the frame. The unauthorized frame detector makes a determination as to whether an identifier of a service included in the frame, a type of the service included in the frame, and port information included in the frame match a permission rule set in advance and outputs a result of the determination. Herein, the type of the service indicates whether an electronic control unit, among the plurality of electronic control units, that has transmitted the frame is to offer the service or is to receive the service, and the port information serves to identify the communication port that has received the frame.

For example, the ECUs that are to be connected to the respective communication ports are set in advance. That is, the identifier of the service, the type of the service, and the port information to be included in a frame transmitted from a given ECU to a communication port connected to this ECU is set in advance. In other words, the identifier of the service, the type of the service, and the port information to be included in a legitimate frame to be received by each of the plurality of communication ports can be set in advance in the form of a permission rule. Then, any unauthorized frame being transmitted can be detected if the aforementioned pieces of information included in a received frame fail to match the permission rule. In this manner, the above configuration makes it possible to detect an anomaly in a frame (also referred to below as a message) based on the physical arrangement of a server or a client and the content of the service in the service-oriented communication, and this can increase the security in the in-vehicle network system. Moreover, the above configuration eliminates the need for the encryption and decryption processing at a transmitting or receiving node. Therefore, the above configuration makes it possible to keep an unauthorized ECU from spoofing as a legitimate server or client while suppressing an overhead during communication.

If a communication port among the plurality of communication ports receives a frame and if the identifier of the service included in the frame, the type of the service included in the frame, and the port information included in the frame fail to match the permission rule, the communication controller may refrain from performing the transfer control for the frame.

According to this configuration, the received frame can be detected as an unauthorized frame in the above case, and this makes it possible to keep an unauthorized frame from being transferred to another ECU. Thus, the security in the in-vehicle network system can be increased.

The unauthorized frame detection device may further include a rule updater. If a communication port among the plurality of communication ports receives a frame that includes manifest information concerning a service to be used by an electronic control unit among the plurality of electronic control units, the rule updater may update the permission rule based on the manifest information and port information identifying the communication port that has received the frame that includes the manifest information.

For example, the permission rule may need to be updated when there is a change in the service offered by an ECU because of an update or the like of the vehicle. Hence, an ECU connected to a communication port of the unauthorized frame detection device is caused to transmit a frame that includes manifest information indicating the service to be used by the ECU, or for example the manifest information indicating the role of the ECU. This configuration makes it possible to update the permission rule based on the manifest information and the port information, that is, based on the manifest information and the physical arrangement of the sender of the message.

The unauthorized frame detection device may further include a rule generator. When the in-vehicle network system is started the first time, the rule generator may generate the permission rule based on the identifier of the service, the type of the service, and the port information included in a frame received by each of the plurality of communication ports.

The in-vehicle network system is started the first time, for example, at the factory or the like of the vehicle before the vehicle is shipped out to the market. The in-vehicle network system started the first time is in a secure state, and any frame that the unauthorized frame detection device receives is a legitimate frame. This, therefore, makes it possible to generate a permission rule for detecting an unauthorized frame based on the communication observed by the in-vehicle network system that is in the secure state as described above. In addition, the permission rule can be generated automatically when the in-vehicle network is started the first time, which can increase the efficiency.

The unauthorized frame detection device may further include a vehicle state determiner that determines a state of a vehicle provided with the in-vehicle network system based on a frame flowing over the plurality of networks. The unauthorized frame detector may determine whether the identifier of the service, the type of the service, the port information, and the state of the vehicle match the permission rule.

For example, there are some services that are used only in predefined vehicle states, and examples include a service used only when the vehicle is stopped or a service used only when the vehicle is traveling. Therefore, the above configuration makes it possible to detect an unauthorized frame based on the vehicle state in which the service is used and the physical arrangement of the server or the client, and the security of the in-vehicle network system can be increased.

The vehicle state determiner may determine whether the state of the vehicle indicates an automatic driving mode. The unauthorized frame detector may determine whether the identifier of the service, the type of the service, the port information, and the state of the vehicle match the permission rule only if the identifier of the service indicates a service concerning automatic driving. The permission rule may include a rule stating that the state of the vehicle indicates the automatic driving mode.

The service concerning the automatic driving requires particularly high security. Therefore, limiting a frame for which any anomaly is detected to a frame pertaining to the service concerning the automatic driving makes it possible to detect an unauthorized frame at a timing at which the service concerning the automatic driving is used, and the security of the in-vehicle network system can be increased.

The service-oriented communication may be Scalable Service Oriented MiddlewarE over IP (SOME/IP), and the type of the service may include any one of Offer, Find, Subscribe, and Subscribe Ack.

This configuration makes it possible to detect an unauthorized frame at the Service Discovery stage of SOME/IP, and this can keep an unauthorized server or client from establishing a session with a legitimate client or server.

An unauthorized frame detection method according to one aspect of the present disclosure is an unauthorized frame detection method performed by an unauthorized frame detection device in an in-vehicle network system that includes a plurality of electronic control units and a plurality of networks. The plurality of electronic control units communicate via the unauthorized frame detection device through service-oriented communication. The unauthorized frame detection device includes a plurality of communication ports corresponding to the respective networks. The plurality of communication ports are each connected to a corresponding predetermined network among the plurality of networks and each include an interface for transmitting or receiving, via the predetermined network, a frame to or from an electronic control unit, among the plurality of electronic control units, that is connected to the predetermined network. The unauthorized frame detection method includes a transfer control step and an unauthorized frame detection step. In the transfer control step, if a communication port among the plurality of communication ports receives a frame, transfer control is performed so as to cause the frame to be transmitted from a communication port other than the communication port that has received the frame among the plurality of communication ports. In the unauthorized frame detection step, a determination is made as to whether an identifier of a service included in the frame, a type of the service included in the frame, and port information included in the frame match a permission rule set in advance, and a result of the determination is output. Herein, the type of the service indicates whether an electronic control unit, among the plurality of electronic control units, that has transmitted the frame is to offer the service or is to receive the service, and the port information serves to identify the communication port that has received the frame.

This method makes it possible to detect an anomaly in a message based on the physical arrangement of a server or a client and the content of the service in the service-oriented communication, and this can increase the security in the in-vehicle network system. In addition, the above method makes it possible to keep an unauthorized ECU from spoofing as a legitimate server or client while suppressing an overhead during communication.

Hereinafter, an in-vehicle network system according to an embodiment of the present disclosure will be described with reference to the drawings. It is to be noted that the embodiment described below merely illustrates a specific, preferable example of the present disclosure. In other words, the numerical values, the shapes, the materials, the constituent elements, the arrangements and the connection modes of the constituent elements, the steps, the order of the steps, and so on illustrated in the following embodiment are examples of the present disclosure and are not intended to limit the present disclosure. The present disclosure is specified based on the claims. Therefore, among the constituent elements in the following embodiment, any constituent element that is not described in the independent claims expressing the broadest concept of the present disclosure is not necessarily required in order to solve the problem faced by the present disclosure but is construed as a constituent element forming a more preferable embodiment.

Embodiment 1

Hereinafter, an unauthorized frame detection device that detects and blocks an unauthorized frame in a vehicle provided with an in-vehicle network system that uses an in-vehicle network in which a plurality of ECUs communicate via a CAN bus and Ethernet will be described.

[1.1 Overall Configuration of In-Vehicle Network System]

FIG. 1 illustrates an overall configuration of in-vehicle network system 1 according to Embodiment 1. In-vehicle network system 1 is provided in a vehicle and includes a plurality of ECUs and a plurality of networks. The plurality of networks include, for example, an Ethernet and a CAN. In-vehicle network system 1 includes Zone ECUs 100a, 100b, 100c, and 100d; brake ECU 200a; steering ECU 200b; camera ECU 200c; head unit ECU 200d; radar ECU 200e; antenna ECU 200f; Ethernets 11, 12, 13, 14, 15, and 16; and CANs and 17.

Zone ECU 100a is connected to Zone ECU 100b via Ethernet 12 and connected to Zone ECU 100c via Ethernet 11. Moreover, Zone ECU 100a is connected to camera ECU 200c and head unit ECU 200d via Ethernet 15.

In addition to being connected to Zone ECU 100a, Zone ECU 100b is connected to Zone ECU 100d via Ethernet 13. Moreover, Zone ECU 100b is connected to radar ECU 200e via CAN 17.

In addition to being connected to Zone ECU 100*a*, Zone ECU 100*c* is connected to Zone ECU 100*d* via Ethernet 14. Moreover, Zone ECU 100*c* is connected to brake ECU 200*a* and steering ECU 200*b* via CAN 10.

In addition to being connected to Zone ECUs 100*b* and 100*c*, Zone ECU 100*d* is connected to antenna ECU 200*f* via Ethernet 16.

The Zone ECUs are connected to each other via the Ethernets and communicate with each other through service-oriented communication. The service-oriented communication is, for example, SOME/IP. The networks that are connected to only one Zone ECU and is not connected to any other Zone ECU—specifically, CANs 10 and 17 and Ethernets 15 and 16—are each called a zone, and each Zone ECU acquires information on the ECU or ECUs (the ECU or ECUs connected to a sensor or an actuator) connected to its corresponding zone and controls the corresponding ECU or ECUs.

[1.2 SOME/IP Message Format]

In SOME/IP, four methods are defined, namely Request/Response, Fire/Forget, Events, and Get/Set/Notifier. Combining these methods makes it possible to implement the service-oriented communication. In SOME/IP, a method for establishing a session with a communicating party is also defined, and this method is called Service Discovery (SD).

Figure 2:
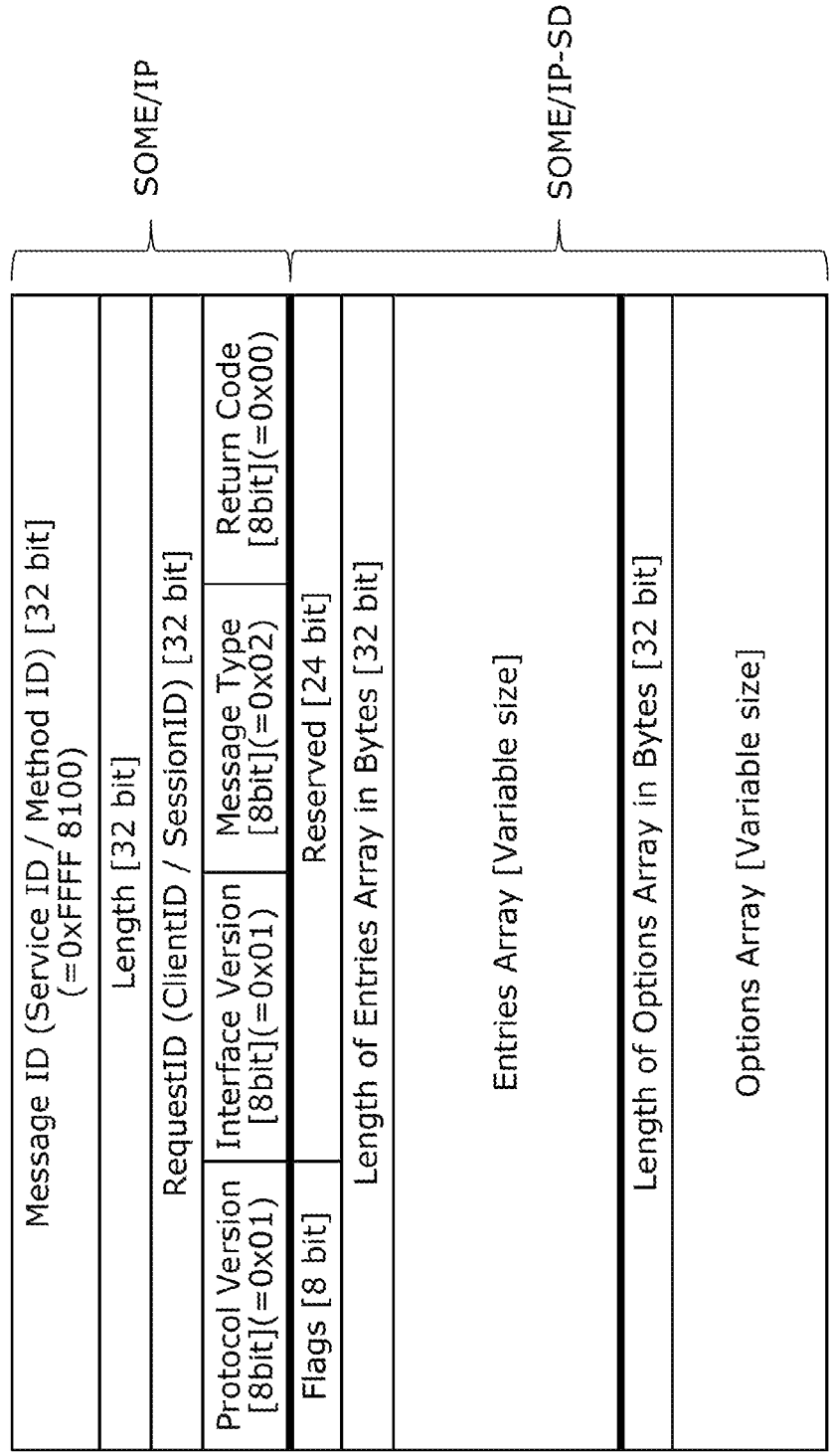
FIG. 2 illustrates a message format of SOME/IP SD according to Embodiment 1.

FIG. 2 illustrates a message format of SOME/IP SD according to Embodiment 1. The message format illustrated in FIG. 2 is stored in the payload section of the Ethernet. The first row in FIG. 2 is 32 bits long. The first half is a SOME/IP header, and the second half is the payload of SOME/IP SD.

Message ID of the SOME/IP header is 0xFFFF8100 in the case of SOME/IP SD. Length stores the number of bytes of the data following the Length field. Request ID stores the numerical value totaling Client ID and Session ID. In the case of Service Discovery, Protocol Version is set to 0x01, Interface Version is set to 0x01, Message Type is set to 0x02, and Return Code is set to 0x00.

FIG. 3 illustrates an example of a message of SOME/IP SD according to Embodiment 1. The SOME/IP SD message illustrated in FIG. 3 is an example of a message indicating that the service whose service ID is 0x1000 can be offered.

First, in the Entry region, Flags is set to 0x80, and Reboot Flag is set. The Reserved region is set to 0. Length of Entries Array in Bytes stores the number of bytes of Entry, and the number of bytes of Entry is 16 in this example.

Type indicates the type of the service, and the type of the service includes any one of Offer, Find, Subscribe, and Subscribe Ack. For example, Type that is set to 0x00 means Find, and Type that is set to 0x01 means Offer. Find is used when a client ECU that is to receive a service requests a necessary service, and Offer is used when a server ECU that is to offer a service notifies a client of a service that the server ECU can offer. In this example, Type is set to 0x01, and this message is a server ECU's message providing information on a service that the server ECU can offer. Index 1st options indicates the position of the first option. In this example, Index 1st options is 0, which means that the position is the beginning. Index 2nd options indicates the position of the second option. In this example, Index 2nd options is 0. # of opt1 indicates the number of options 1. In this example, # of opt1 stores 1. # of opt2 indicates the number of options 2. In this example, # of opt2 stores 0, which means that no option 2 is used.

Service ID is a field that stores the ID indicating the type of the service. In the example illustrated in FIG. 3, Service ID stores 0x1000. Instance ID is the ID indicating the instance of the service. In the example illustrated in FIG. 3, Instance ID is 0x0001, which means this is the instance of 0x0001.

Major Version is the information used for the version management of a service. In the example illustrated in FIG. 3, Major Version is set to 0x01. TTL is a field where the duration (the seconds) for which a service is valid is set. In the example illustrated in FIG. 3, TTL is set to 0xFFFF. When TTL is 0xFFFF, this means that the service is valid until the timing at which the ECU is rebooted the next time. Minor Version is the information used for the version management of a service. In the example illustrated in FIG. 3, Minor Version is set to 0x00000002.

Next, In the Option region, first, Length of Options Array in Bytes stores the length of the Option region. In the example illustrated in FIG. 3, the Option region is 12 bytes long.

The value set in Length following Length of Options Array in Bytes is determined in accordance with the type of the option. FIG. 3 illustrates an example of communication involving IPv4. In this case, Length is 9, Type is 0x04, and Reserved is 0x00. The IPv4 address indicates the IP address of a server. In the example illustrated in FIG. 3, 192.168.0.1 is set in the IPv4 address. The Reserved region following the Ipv4 address stores 0. L4-Proto stores 0x11, and this means that User Datagram Protocol (UDP) is used. The port number is stored at the end. The example illustrated in FIG. 3 indicates that this is port 35000.

[1.3 Configuration of Zone ECU 100*a*]

Next, the Zone ECUs will be described with Zone ECU 100*a* serving as an example.

Figure 4:
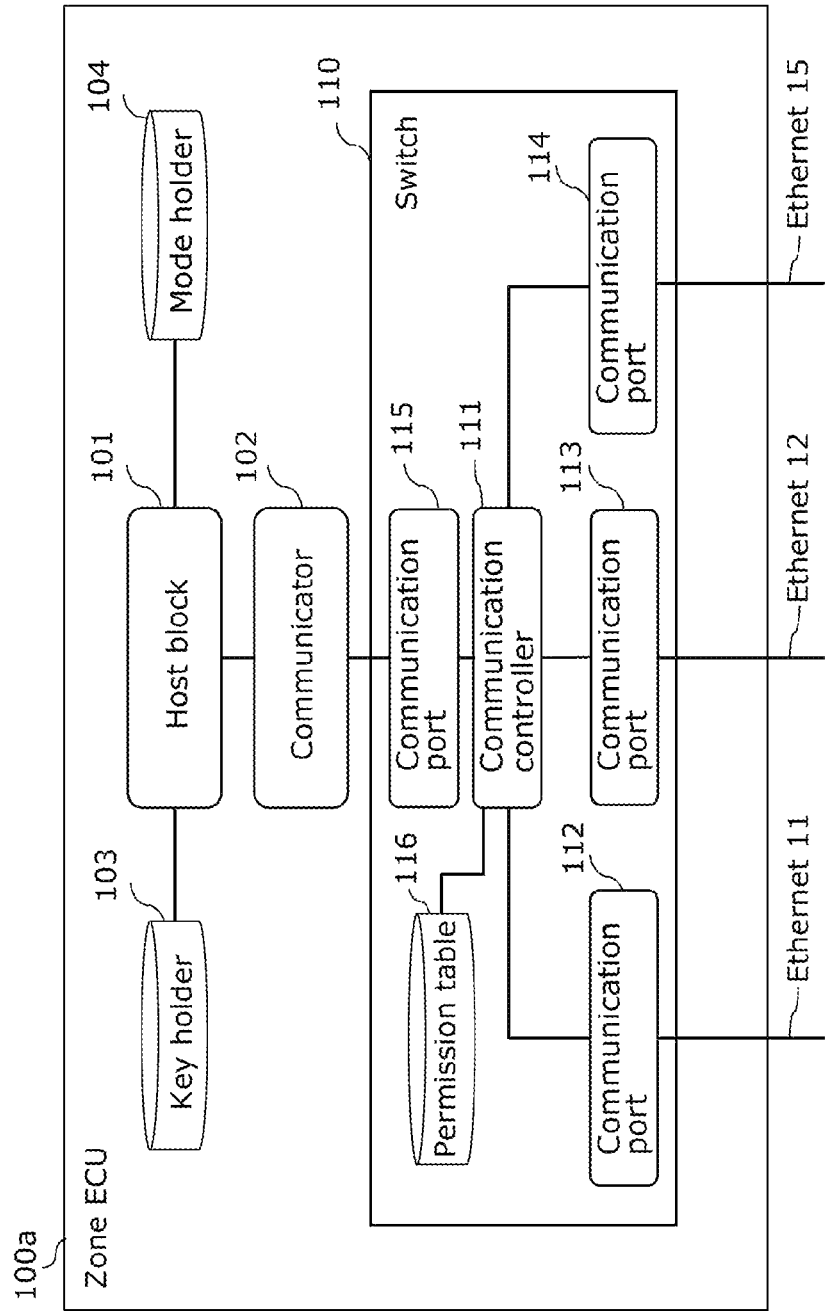
FIG. 4 illustrates a configuration of a Zone ECU according to Embodiment 1.

FIG. 4 illustrates a configuration of Zone ECU 100*a* according to Embodiment 1. Zone ECU 100*a* is implemented by a computer that includes, for example, a processor, a memory, and a communication interface. Zone ECU 100*a* includes host block 101, communicator 102, key holder 103, and switch 110. Moreover, Zone ECU 100*a* includes an unauthorized frame detection device. The unauthorized frame detection device includes a plurality of communication ports corresponding to respective networks, a communication controller, and an unauthorized frame detector. Switch 110 of Zone ECU 100*a* may constitute the unauthorized frame detection device, and the unauthorized frame detector may be implemented by communication controller 111 described later. Alternatively, host block 101, communicator 102, and switch 110 of Zone ECU 100*a* may constitute the unauthorized frame detection device, and the unauthorized frame detector may be implemented by host block 101.

In this example, Zone ECUs 100*b*, 100*c*, and 100*d* each have a configuration that is similar to the configuration of Zone ECU 100*a* but is partially different in terms of how many Ethernets are connected to each of ECUs 100*b*, 100*c*, and 100*d* and whether ECUs 100*b*, 100*c*, and 100*d* are connected to a CAN. For example, Zone ECU 100*b* is connected to two Ethernets, and CAN 17 is connected to communicator 102. The plurality of ECUs 100*a*, 100*b*, 100*c*, and 100*d* communicate with each other through the service-oriented communication via their respective unauthorized frame detection devices (specifically, switch 110).

Host block 101 is a main part of Zone ECU 100*a* and is implemented by a CPU and a memory. Host block 101 receives communication content from communicator 102 and performs a process corresponding to the received communication content. For example, in the case of Zone ECU 100*a*, host block 101 of Zone ECU 100*a* receives information transmitted from camera ECU 200c and performs a process of recognizing whether there is any vehicle traveling nearby. Then, host block 101 of Zone ECU 100a transmits control information to Zone ECU 100b in order to control brake ECU 200a or steering ECU 200b.

In this manner, host block 101 of each Zone ECU implements a process of controlling the vehicle by receiving the communication content flowing over the network of the zone to which the Zone ECU is connected as well as the communication content from the other Zone ECUs, that is, the communication content in the other zones and by interpreting the received pieces of communication content.

Moreover, in order to update permission table 116 in switch 110, host block 101 verifies whether a received frame is a frame indicating an update request from a legitimate ECU by use of a key stored in key holder 103.

Moreover, host block 101 is an example of a rule generator that, when in-vehicle network system 1 is started the first time, generates (registers) a permission rule based on the identifier of a service, the type of a service, and the port information included in a frame that the plurality of communication ports have each received.

Moreover, host block 101 is an example of a vehicle state determiner that determines the state of the vehicle provided with in-vehicle network system 1 based on a frame flowing over the plurality of networks. Host block 101 refers to the mode and the vehicle state stored in mode holder 104 and performs an update.

Communicator 102 is a communication interface between host block 101 and switch 110 or a communication interface of a CAN. Communicator 102 is implemented by a communication controller, a transceiver, or the like.

Key holder 103 holds secret information to be used in an encryption process or the like.

Mode holder 104 holds the mode indicating either an initialization mode or a normal mode as well as the vehicle state. The values in mode holder 104 are updated by host block 101.

Switch 110 is a device that controls the transfer of an Ethernet frame. Switch 110 includes communication controller 111, communication ports 112, 113, 114, and 115, and permission table 116.

If any one of the plurality of communication ports receives a frame, communication controller 111 performs transfer control so that the frame is transmitted from a communication port, among the plurality of communication ports, other than the communication port that has received the frame. Specifically, communication controller 111 checks the IP address, the port number, the MAC address, the VLAN tag, and so on included in the Ethernet frame transmitted from communication port 112, 113, or 114 and transfers the Ethernet frame to an appropriate communication port.

Moreover, in order to inform host block 101 of the received content, communication controller 111 transmits the Ethernet frame to communication port 115 as well.

Moreover, communication controller 111 determines whether the identifier of the service, the type of the service indicating whether the Zone ECU that has transmitted the frame is offering the service or receiving the service, and the port information for identifying the communication port that has received the frame that are each included in the frame received by the communication port match the permission rule set in advance and outputs the result of this determination. The permission rule is stored in permission table 116. Moreover, if any one of the plurality of communication ports receives a frame and if the identifier of the service, the type of the service, and the port information that are each included in the received frame fail to match the permission rule, communication controller 111 refrains from performing the transfer control for this frame. Specifically, in order to keep an unauthorized frame from being transferred, communication controller 111 refers to permission table 116 and checks whether the service in the SOME/IP corresponds to the type of the message and the receiving port number. Then, communication controller 111 refrains from transferring the received frame if the checked information fails to match the permission rule stored in permission table 116.

In this example, host block 101 may determine whether the identifier of the service, the type of the service indicating whether the Zone ECU that has transmitted the frame is offering the service or receiving the service, and the port information for identifying the communication port that has received the frame that are each included in the frame received by the communication port match the permission rule set in advance and output the result of this determination.

Communication ports 112, 113, 114, and 115 are each a communication interface with a communication destination. The plurality of communication ports are each connected to a corresponding predetermined network among the plurality of networks and each include an interface that transmits or receives, via the predetermined network, a frame to or from a Zone ECU connected to the predetermined network. Communication port 112 is connected to Ethernet 11 serving as the predetermined network and serves as a communication interface with Zone ECU 100c connected to Ethernet 11. Communication port 113 is connected to Ethernet 12 serving as the predetermined network and serves as a communication interface with Zone ECU 100b connected to Ethernet 12. Communication port 114 is connected to Ethernet 15 serving as the predetermined network and serves as a communication interface with camera ECU 200c and head unit ECU 200d connected to Ethernet 15. Communication port 115 is connected to communicator 102 and serves as a communication interface with host block 101.

Permission table 116 holds the permission rule for keeping an unauthorized SOME/IP message from being transferred. Permission table 116 is implemented by a non-volatile memory, such as a flash memory. The details of permission table 116 will be described later.

[1.4 Configuration of Brake ECU 200a]

Figure 5:
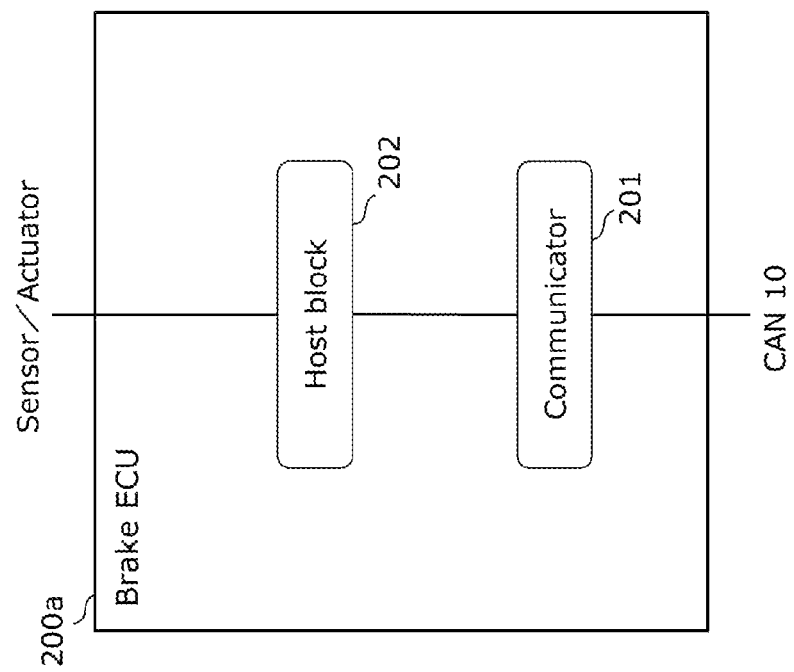
FIG. 5 illustrates a configuration of a brake ECU according to Embodiment 1.

FIG. 5 illustrates a configuration of brake ECU 200a according to Embodiment 1. In this example, steering ECU 200b, camera ECU 200c, head unit ECU 200d, radar ECU 200e, and antenna ECU 200f each have a configuration similar to the configuration of brake ECU 200a, and thus the descriptions of their configurations will be omitted.

As illustrated in FIG. 5, brake ECU 200a includes communicator 201 and host block 202.

Communicator 201 is a connection interface with a network and is connected to CAN 10. Communicator 201 receives a frame flowing over the network and transmits the frame to host block 202. In addition, communicator 201 receives a transmission request from host block 202 and transmits a frame to CAN 10.

Host block 202 requests communicator 201 to transmit a frame including information acquired from an externally connected device, such as a sensor or an actuator. Moreover, host block 202 performs a process of controlling the actuator based on the information in the frame transmitted from communicator 201.

[1.5 Example of Key Stored in Key Holder]

FIG. 6 illustrates an example of a key stored in key holder 103 according to Embodiment 1. As illustrated in FIG. 6, a key is held for each communication port. When there is an update on the service in SOME/IP offered by an ECU associated with an update or the like of the vehicle, a private key is used to modify (update) permission table 116. Zone ECU 100a performs challenge response authentication by using a private key and adds or deletes the port number or changes the type of the service in permission table 116 only when Zone ECU 100a has successfully determined that the change request has been transmitted from a legitimate ECU.

In the example illustrated in FIG. 6, the key corresponding to communication port 112 is 0x11111111, the key corresponding to communication port 113 is 0x22222222, the key corresponding to communication port 114 is 0x33333333, and the key corresponding to communication port 115 is 0x44444444. The keys are written into key holder 103 at the manufacturing stage in a factory.

In the present embodiment, key holder 103 holds the keys for the respective communication ports. Alternatively, key holder 103 may holder keys for respective ECUs. Moreover, the present embodiment assumes that the keys held in key holder 103 are shared keys. Alternatively, key holder 103 may hold the public keys of the other ECUs or a private key of its own. The keys do not need to be written into key holder 103 when the vehicle is shipped out from a factory. For example, the keys may be replaced when the ignition is turned ON the first time, or the keys may be shared by use of a public key each time the ignition is turned ON.

[1.6 Example of Mode Stored in Mode Holder]

FIG. 7 illustrates an example of the mode and an example of the vehicle state stored in mode holder 104 according to Embodiment 1. The mode includes an "initialization mode" and a "normal mode". The initial registration of permission table 116 (i.e., the generation of the permission rule) is performed in the "initialization mode", and an unauthorized frame is detected in the "normal mode" based on the permission rule stored in permission table 116.

The mode is in the "initialization mode" when the ignition is started the first time after the vehicle has been completed, and the mode is switched to the "normal mode" by host block 101 when the initial registration of permission table 116 has been performed and the ignition has been turned OFF.

The vehicle state is determined and updated by host block 101 based on the sensor information obtained via an Ethernet or a CAN. For example, host block 101 updates the vehicle state to a "stopped state" if the speed of the vehicle is 0 km/h or updates the vehicle state to a "traveling state" in other cases.

In the example illustrated in FIG. 7, the current mode is the "normal mode", and the vehicle state is the "traveling state".

[1.7 Example of Rule Stored in Permission Table]

FIG. 8 illustrates an example of the permission rule stored in permission table 116 of Zone ECU 100a according to Embodiment 1. As illustrated in FIG. 8, the permission rule is indicated by the set of Service ID, the type, the communication port, and the vehicle state.

Service ID is Service ID included in a SOME/IP message and is an identifier indicating the content of the service. The type of the service indicates whether the ECU that has transmitted the frame is to offer the service or is to receive the service. As with Service ID, the type is Type included in a SOME/IP message and is used to identify whether the message is from the server or from the client. The communication port is the port information for identifying the communication port that has received the frame. In this example, the table shows the ports that each receive a SOME/IP message whose Service ID and type match Service ID and the type indicated in the corresponding rule. It is to be noted that the number of the ports that receive a SOME/IP message whose Service ID and type match Service ID and the type indicated in the corresponding rule is not limited to one. Meanwhile, the vehicle state indicates the vehicle state in which the corresponding SOME/IP message is communicated.

In the example illustrated in FIG. 8, the message in which Service ID is 0x1000 is a message for performing steering instruction control as the service. According to FIG. 8, the server ECU that performs Offer of this service is connected to communication port 115, and switch 110 receives the message in which Service ID is 0x1000 and the type is Offer from communication port 115 while the vehicle state indicates the vehicle is stopped. In a similar manner, according to FIG. 8, the client ECU that performs Find of the service having Service ID of 0x1000 is connected to communication port 112, and switch 110 receives the message in which Service ID is 0x1000 and the type is Find from communication port 112 while the vehicle state indicates the vehicle is stopped.

According to FIG. 8, the server ECU that performs Offer of the service having Service ID of 0x1010 is connected to communication port 112, and switch 110 receives consistently the message in which Service ID is 0x1010 and the type is Offer from communication port 112 regardless of the vehicle state. According to FIG. 8, the client ECU that performs Find of the service having Service ID of 0x1010 is connected to communication port 115, and switch 110 receives consistently the message in which Service ID is 0x1010 and the type is Find from communication port 115 regardless of the vehicle state.

According to FIG. 8, the server ECU that performs Offer of the service having Service ID of 0x2000 is connected to communication port 113, and switch 110 receives consistently the message in which Service ID is 0x2000 and the type is Offer from communication port 113 regardless of the vehicle state. According to FIG. 8, the client ECU that performs Find of the service having Service ID of 0x2000 is connected to communication port 112 or 115, and switch 110 receives consistently the message in which Service ID is 0x2000 and the type is Find from communication port 112 or 115 regardless of the vehicle state.

According to FIG. 8, the server ECU that performs Offer of the service having Service ID of 0x3000 is connected to communication port 114, and switch 110 receives consistently the message in which Service ID is 0x3000 and the type is Offer from communication port 114 regardless of the vehicle state. According to FIG. 8, the client ECU that performs Find of the service having Service ID of 0x3000 is connected to communication port 115, and switch 110 receives consistently the message in which Service ID is 0x3000 and the type is Find from communication port 115 regardless of the vehicle state.

In the case illustrated in the present embodiment, the type is either one of Offer and Find of SOME/IP SD, but this may not be a limiting example. For example, the type may be either one of Subscribe and Subscribe Ack.

[1.8 Permission Table Registration Sequence in Initialization Mode Performed by Zone ECU]

Figure 9:
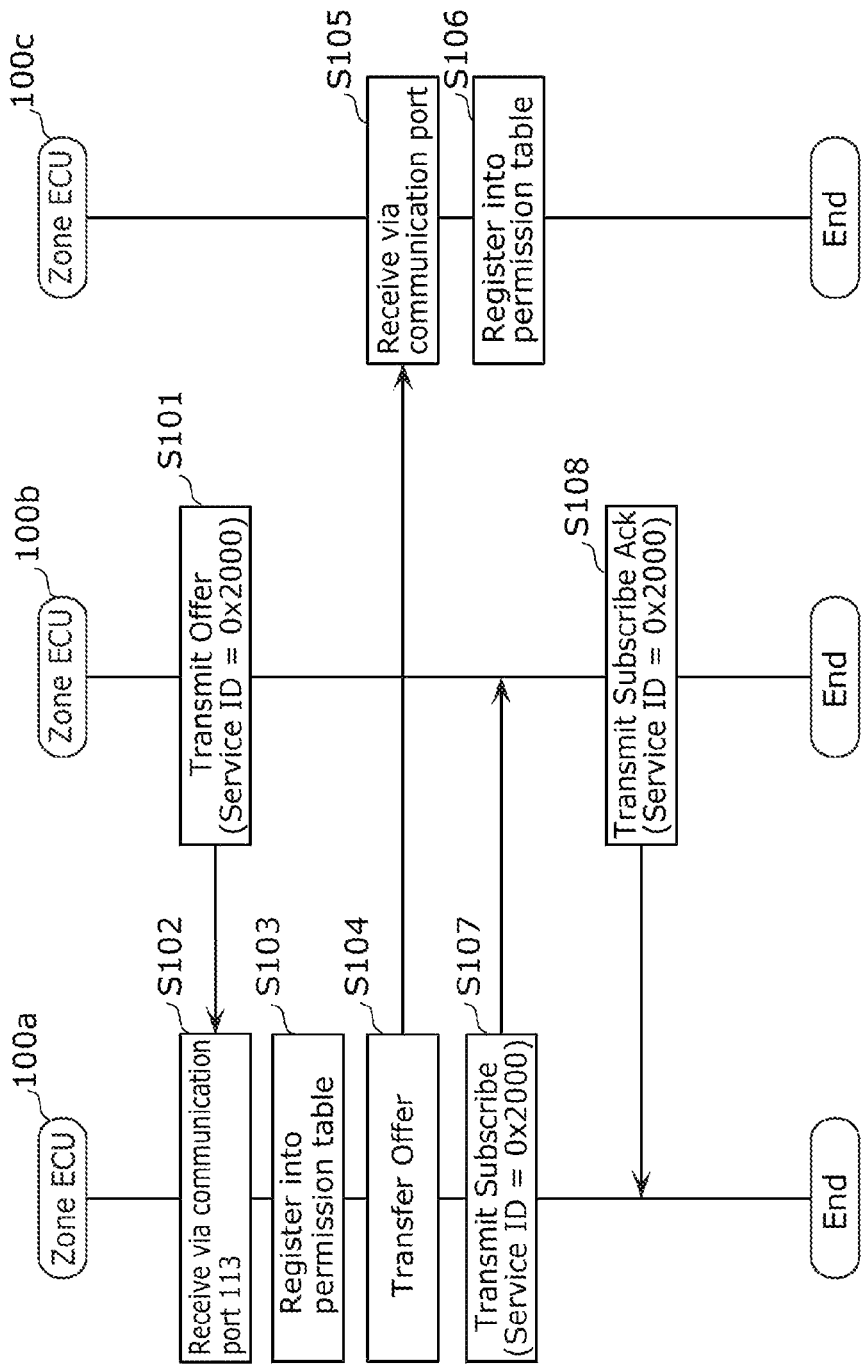
FIG. 9 illustrates a registration sequence of a permission table in an initialization mode as performed by a Zone ECU according to Embodiment 1.

FIG. 9 illustrates a registration sequence of permission table 116 in an initialization mode as performed by a Zone ECU according to Embodiment 1.

(Step S101) Zone ECU 100b first transmits, to Ethernet 12, a SOME/IP SD message in which the type is Offer in order to inform Zone ECU 100a that Zone ECU 100b can offer the service whose Service ID is 0x2000.

(Step S102) Zone ECU 100a receives the message in which Service ID is 0x2000 and the type is Offer via communication port 113 connected to Ethernet 12.

(Step S103) Next, Zone ECU 100a registers, into permission table 116, a permission rule indicating that Service ID is 0x2000, the type is Offer, and the communication port is 113.

(Step S104) Zone ECU 100a transfers the received message in which Service ID is 0x2000 and the type is Offer via a communication port other than the communication port via which Zone ECU 100a has received the message.

(Step S105) Zone ECU 100c receives the message in which Service ID is 0x2000 and the type is Offer via a specific communication port.

(Step S106) Zone ECU 100c registers, into permission table 116 included in Zone ECU 100c, a permission rule concerning the received message in which Service ID is 0x2000 and the type is Offer.

(Step S107) Zone ECU 100a transmits, to Zone ECU 100b, a message in which Service ID is 0x2000 and the type is Subscribe in order to receive the offer of the service indicated by the message received from Zone ECU 100b.

(Step S108) Zone ECU 100b receives the message in which Service ID is 0x2000 and the type is Subscribe from Zone ECU 100a and returns a message in which Service ID is 0x2000 and the type is Subscribe Ack to Zone ECU 100a.

[1.9 Filtering Sequence in Normal Mode Performed by Zone ECU]

Figure 10:
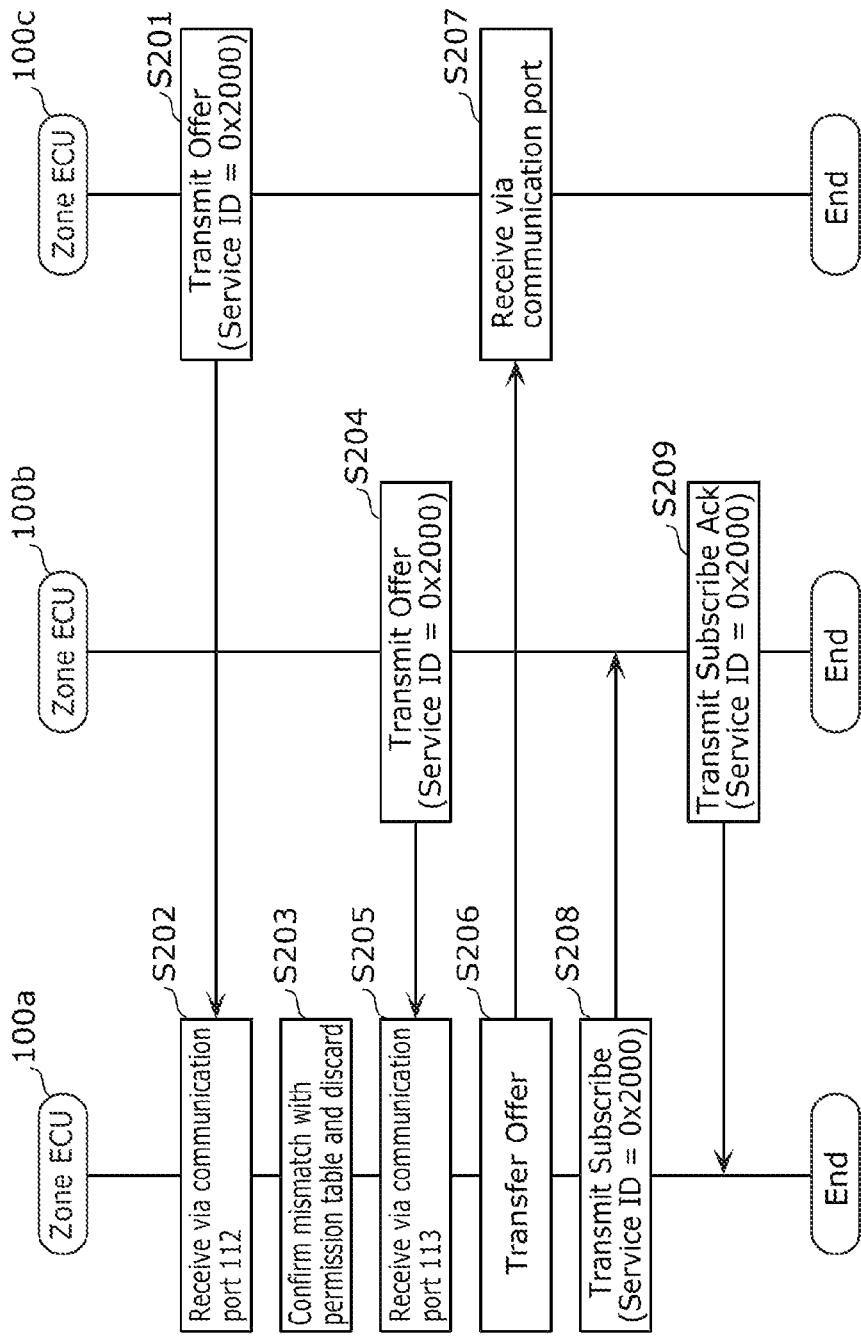
FIG. 10 illustrates a sequence of blocking an unauthorized frame in a normal mode as performed by a Zone ECU according to Embodiment 1.

FIG. 10 illustrates a sequence of blocking an unauthorized frame in a normal mode as performed by a Zone ECU according to Embodiment 1. In the example illustrated in FIG. 10, Zone ECU 100c is an unauthorized ECU and tries to offer a service maliciously by transmitting an unauthorized Offer message. In this example, permission table 116 registered as illustrated in FIG. 9 is used.

(Step S201) Zone ECU 100c transmits, to Ethernet 11, a message in which Service ID is 0x2000 and the type is Offer.

(Step S202) Zone ECU 100a receives, from Zone ECU 100c, the transmitted message in which Service ID is 0x2000 and the type is Offer via communication port 112 connected to Ethernet 11.

(Step S203) Zone ECU 100a refers to permission table 116. Permission table 116 includes a permission rule indicating that a message in which Service ID is 0x2000 and the type is Offer is to be received via communication port 113. Therefore, Zone ECU 100a determines that the message in which Service ID is 0x2000 and the type is Offer received via communication port 112 is unauthorized and discards this message without transferring the message.

(Step S204) Next, legitimate Zone ECU 100b transmits, to Ethernet 12, a message in which Service ID is 0x2000 and the type is Offer.

(Step S205) Zone ECU 100a receives, from Zone ECU 100b, the transmitted message in which Service ID is 0x2000 and the type is Offer via communication port 113 connected to Ethernet 12.

(Step S206) Zone ECU 100a refers to permission table 116. The received message in which Service ID is 0x2000 and the type is Offer matches the permission rule stored in permission table 116. Therefore, Zone ECU 100a determines that the message in which Service ID is 0x2000 and the type is Offer received via communication port 113 is legitimate and transfers this message to another communication port.

(Step S207) Zone ECU 100c receives the transferred message in which Service ID is 0x2000 and the type is Offer.

(Step S208) Zone ECU 100a transmits, to Zone ECU 100b, a message in which Service ID is 0x2000 and the type is Subscribe in order to receive the offer of the service indicated by the message received from Zone ECU 100b.

(Step S209) Zone ECU 100b transmits, to Zone ECU 100a, a message in which Service ID is 0x2000 and the type is Subscribe Ack in order to notify Zone ECU 100a that Zone ECU 100b has received the message transmitted from ECU 100a.

[1.10 Permission Table Updating Sequence Performed by Zone ECU]

Figure 11:
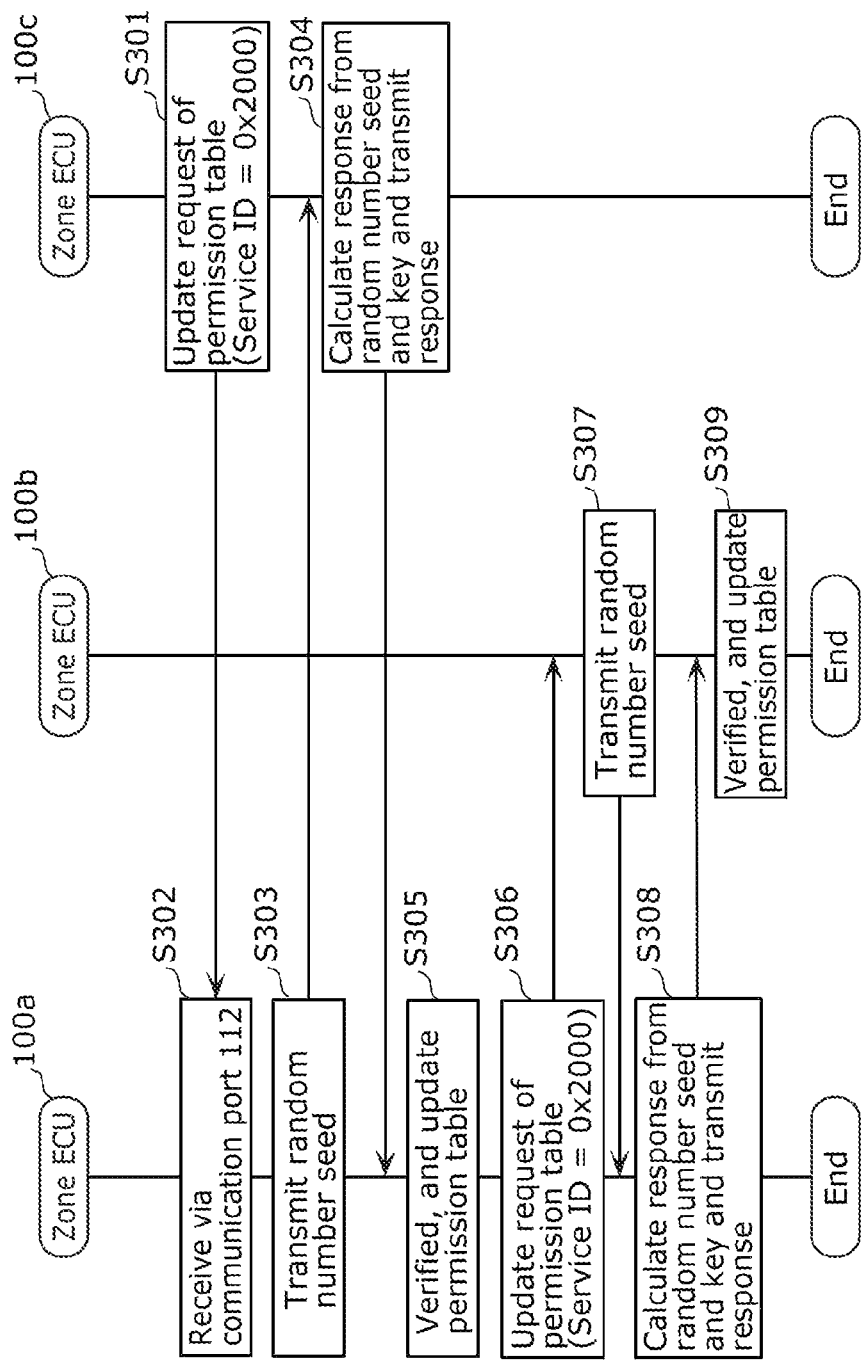
FIG. 11 illustrates an updating sequence of a permission table in a normal mode as performed by a Zone ECU according to Embodiment 1.

FIG. 11 illustrates an updating sequence of permission table 116 in a normal mode as performed by a Zone ECU according to Embodiment 1.

(Step S301) Zone ECU 100c transmits, to Ethernet 11, an update request of permission table 116 concerning a message in which Service ID is 0x2000, or specifically, an update request requesting that the transmission of an Offer message be stopped.

(Step S302) Zone ECU 100a receives the update request via communication port 112 connected to Ethernet 11.

(Step S303) Zone ECU 100a generates a random number seed and transmits the generated random number seed to Zone ECU 100c in order to check whether the received update request is a legitimate request.

(Step S304) Zone ECU 100c calculates a response through a predetermined arithmetic operation by using the received random number seed and a key held in key holder 103 and transmits the calculated response to Zone ECU 100a.

(Step S305) Zone ECU 100a verifies the response, determines that the update request is legitimate, and updates permission table 116 in accordance with the update request.

(Step S306) In order to have permission table 116 concerning a message in which Service ID is 0x2000 updated by the Zone ECUs in the other networks, Zone ECU 100a transmits an update request to the other communication ports as well.

(Step S307) Zone ECU 100b transmits a random number seed to Zone ECU 100a in order to check whether the received update request is legitimate.

(Step S308) Zone ECU 100a calculates a response through a predetermined arithmetic operation by using the received random number seed and a key stored in key holder 103 and transmits the calculated response to Zone ECU 100b.

(Step S309) Zone ECU 100b verifies the received response, determines that the update request is legitimate, and updates permission table 116 in accordance with the update request.

[1.11 Flowchart of Overall Process of Zone ECU]

Next, an overall process of a Zone ECU will be described. In this example, an overall process of Zone ECU 100a serving as a representative example of the Zone ECUs will be described.

Figure 12:
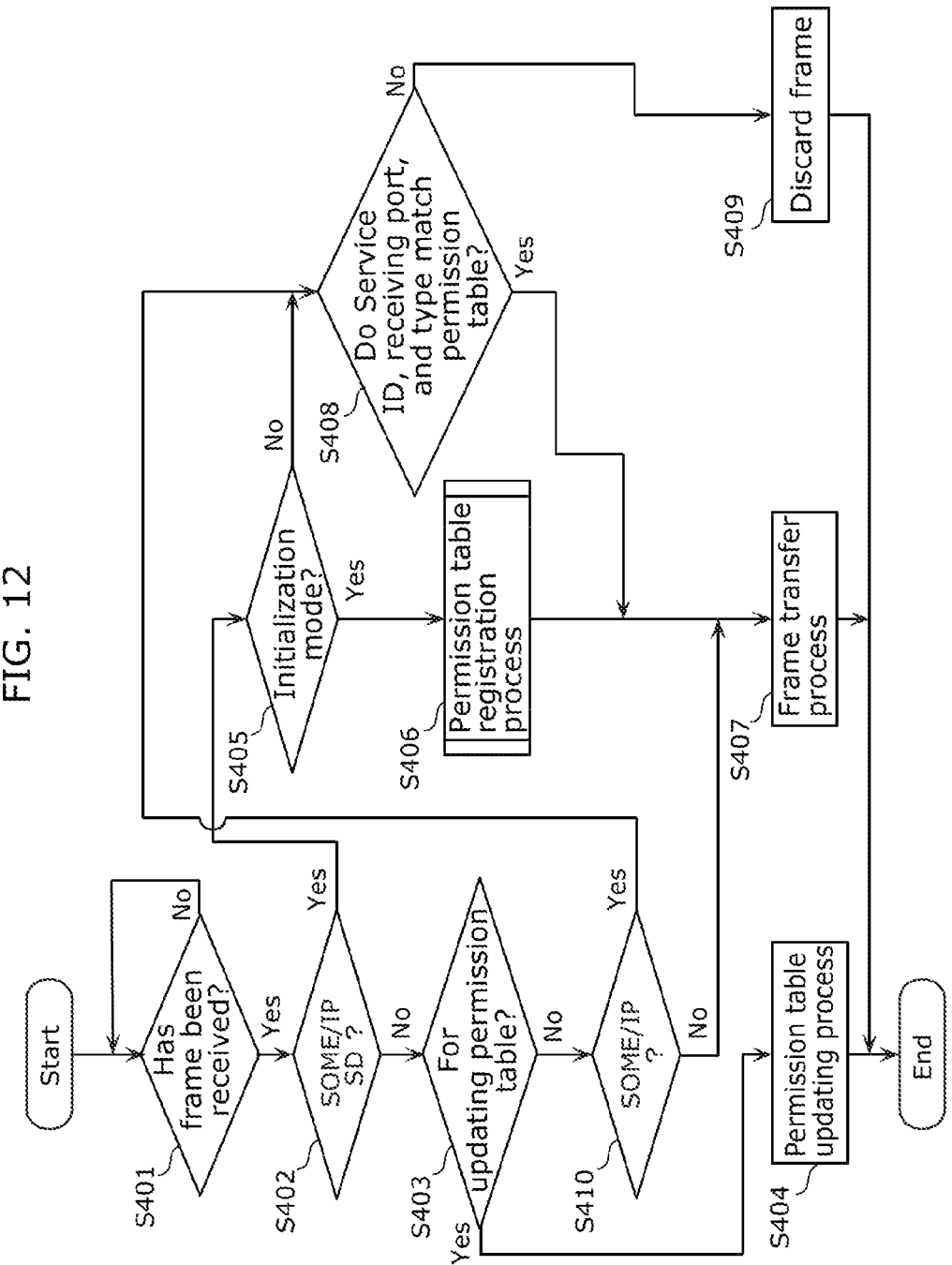
FIG. 12 is a flowchart of an overall process performed by a Zone ECU according to Embodiment 1.

FIG. 12 is a flowchart of an overall process performed by Zone ECU 100a according to Embodiment 1. Zone ECU 100a performs control and a communication process in accordance with a received frame, but the descriptions thereof will be omitted in this example.

(Step S401) Zone ECU 100a determines whether Zone ECU 100a has received a frame. If Zone ECU 100a does not receive a frame (if NO), Zone ECU 100*a* executes step S401 until Zone ECU 100*a* receives a frame. Otherwise, that is, if Zone ECU 100*a* has received a frame (if Yes), Zone ECU 100*a* performs step S402.

(Step S402) Zone ECU 100*a* checks whether the received frame is for SOME/IP SD communication. If the received frame is not a SOME/IP SD message (if No), Zone ECU 100*a* executes step S403. Meanwhile, if the received frame is a SOME/IP SD message (if Yes), Zone ECU 100*a* executes step S405.

(Step S403) Zone ECU 100*a* checks whether the received frame is a frame for updating the permission table. If the received frame is a frame for updating the permission table (if Yes), Zone ECU 100*a* executes step S404. Meanwhile, if the received frame is not a frame for updating the permission table (if No), Zone ECU 100*a* executes step S410.

(Step S404) Zone ECU 100*a* performs a process of updating permission table 116. Specifically, as indicated in the sequence illustrated in FIG. 10, Zone ECU 100*a* performs the challenge response authentication and updates permission table 116 if the request is a legitimate update request. Moreover, Zone ECU 100*a* transmits the update request of permission table 116 to other networks as well. If the request is not a legitimate update request, Zone ECU 100*a* refrains from updating permission table 116.

(Step S405) Zone ECU 100*a* checks whether Zone ECU 100*a* is in the initialization mode in response to receiving a frame including SOME/IP SD. If Zone ECU 100*a* is in the initialization mode (if Yes), Zone ECU 100*a* executes step S406. Otherwise, that is, if Zone ECU 100*a* is in the normal mode (if No), Zone ECU 100*a* executes step S408.

(Step S406) If Zone ECU 100*a* is in the initialization mode, Zone ECU 100*a* registers a permission rule into permission table 116 based on the information included in the received SOME/IP SD message and executes step S407.

(Step S407) Zone ECU 100*a* transfers the received SOME/IP SD message to another communication port.

(Step S408) Zone ECU 100*a* checks whether Service ID, the receiving port, and the type (Offer or Find) in the received SOME/IP SD message match the permission rule included in permission table 116. If Service ID, the receiving port, and the type (Offer or Find) in the received SOME/IP SD message match permission table 116 (if Yes), Zone ECU 100*a* executes step S407. Meanwhile, if Service ID, the receiving port, and the type (Offer or Find) in the received SOME/IP SD message do not match permission table 116 (if No), Zone ECU 100*a* executes step S409.

(Step S409) Zone ECU 100*a* discards the received SOME/IP SD message.

(Step S410) Zone ECU 100*a* checks whether the received frame is a SOME/IP message. If the received frame is a SOME/IP message (if Yes), Zone ECU 100*a* executes step S408. In this case, Zone ECU 100*a* transfers the SOME/IP message to another communication port at step S407 if the determination result is Yes at step S408 or discards the SOME/IP message at step S409 if the determination result is No at step S408. If the received frame is not a SOME/IP message (if No), Zone ECU 100*a* executes step S407. At step S407 in this case, Zone ECU 100*a* transfers the received frame to another communication port.

[1.12 Flowchart Concerning Mode Change Performed by Zone ECU]

Figure 13:
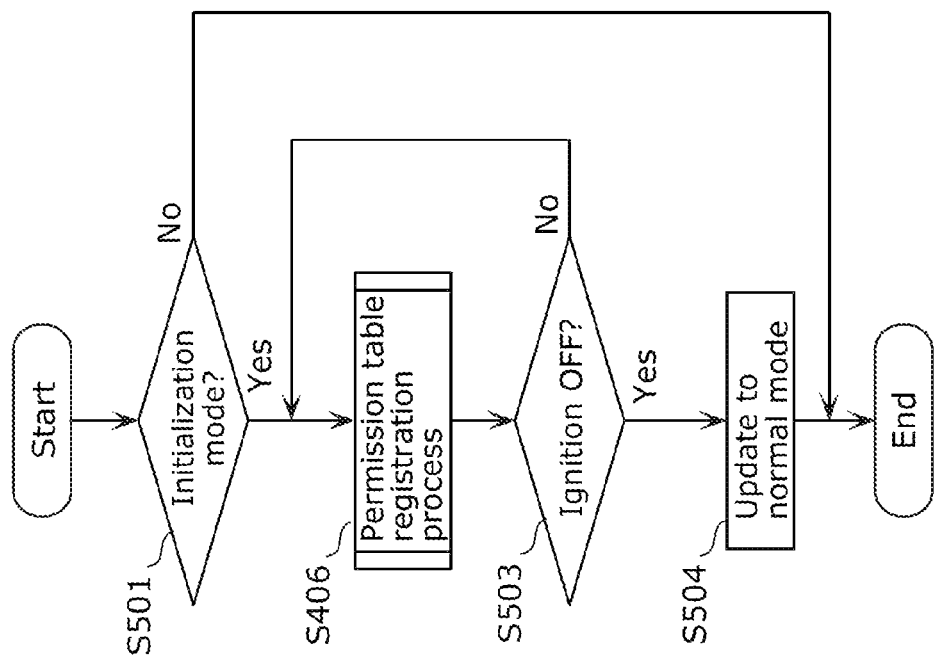
FIG. 13 is a flowchart of a mode changing process performed by a Zone ECU according to Embodiment 1.

FIG. 13 is a flowchart of a mode changing process performed by Zone ECU 100*a* according to Embodiment 1. This process is executed in parallel with the overall process of Zone ECU 100*a* illustrated in FIG. 12.

(Step S501) Zone ECU 100*a* checks whether Zone ECU 100*a* is in the initialization mode. If Zone ECU 100*a* is in the initialization mode (if Yes), Zone ECU 100*a* executes step S406. Meanwhile, if Zone ECU 100*a* is not in the initialization mode (if No), Zone ECU 100*a* terminates the mode changing process.

(Step S406) Zone ECU 100*a* registers a permission rule into permission table 116 based on the received SOME/IP SD message. The content of the process performed at step S406 is similar to the content of the process illustrated in FIG. 12, and thus the descriptions thereof will be omitted.

(Step S503) Zone ECU 100*a* checks whether the ignition is OFF. If the ignition is OFF (if Yes), Zone ECU 100*a* executes step S504. Meanwhile, if the ignition is not OFF (if No), Zone ECU 100*a* executes step S406 and continues with the registration process of permission table 116.

(Step S504) Zone ECU 100*a* updates its own mode to the normal mode.

[1.13 Advantageous Effects of Embodiment 1]

In in-vehicle network system 1 according to Embodiment 1, with regard to SOME/IP SD communication, a Zone ECU grasps the physical arrangement of a server ECU and a client ECU based on the connection port (specifically, the Zone ECU performs mapping of the physical arrangement information of the ECUs connected to the in-vehicle network with the server and the client for each service based on a SOME/IP SD message). Thus, the Zone ECU detects a spoofing message of a server or a client transmitted by an unauthorized ECU. In other words, even if an attacker transmits an unauthorized frame in an in-vehicle network that adopts service-oriented communication, such as SOME/IP, the transmission of any unauthorized frame can be detected based on the relationship between the ports physically connecting the server and the client. This configuration can help increase the security in the in-vehicle network provided in the vehicle.

Furthermore, the Zone ECU blocks a frame determined to be unauthorized from being transferred to another network. This configuration can keep a legitimate ECU from establishing a session with an unauthorized ECU and can help increase the security in the in-vehicle network.

[Other Variations]

The present disclosure has been described based on the foregoing embodiment. It is needless to say, however, that the present disclosure is not limited to the foregoing embodiment. The cases such as the following are also encompassed by the present disclosure.

(1) In the example described in the foregoing embodiment, the present disclosure is applied to SOME/IP communication. This, however, is not a limiting example, and the present disclosure may be applied to other types of service-oriented communication.

(2) In the example described in the foregoing embodiment, the type in the permission rule in permission table 116 includes Offer and Find. This type may include different entries. For example, the type may be Subscribe, Subscribe Ack, or any type used in normal SOME/IP.

Moreover, permission table 116 may hold, as the type in the permission rule, the role, such as a server or a client, with regard to a service.

(3) In the example described in the foregoing embodiment, a Zone ECU updates permission table 116 based on a frame for updating the permission table while the Zone ECU is in the normal mode. Alternatively, the Zone ECU may update permission table 116 without using a frame for updating the permission table.

For example, if a Zone ECU has observed a SOME/IP SD message whose Service ID is not registered in permission table 116, the Zone ECU may update the permission rule upon a SOME/IP communication session being established on the basis that a new service has been added through an update of an ECU.

Then, the permission rule can be updated without the updating process of permission table 116, and this can help reduce the processing overhead and improve efficiency.

Figure 14:
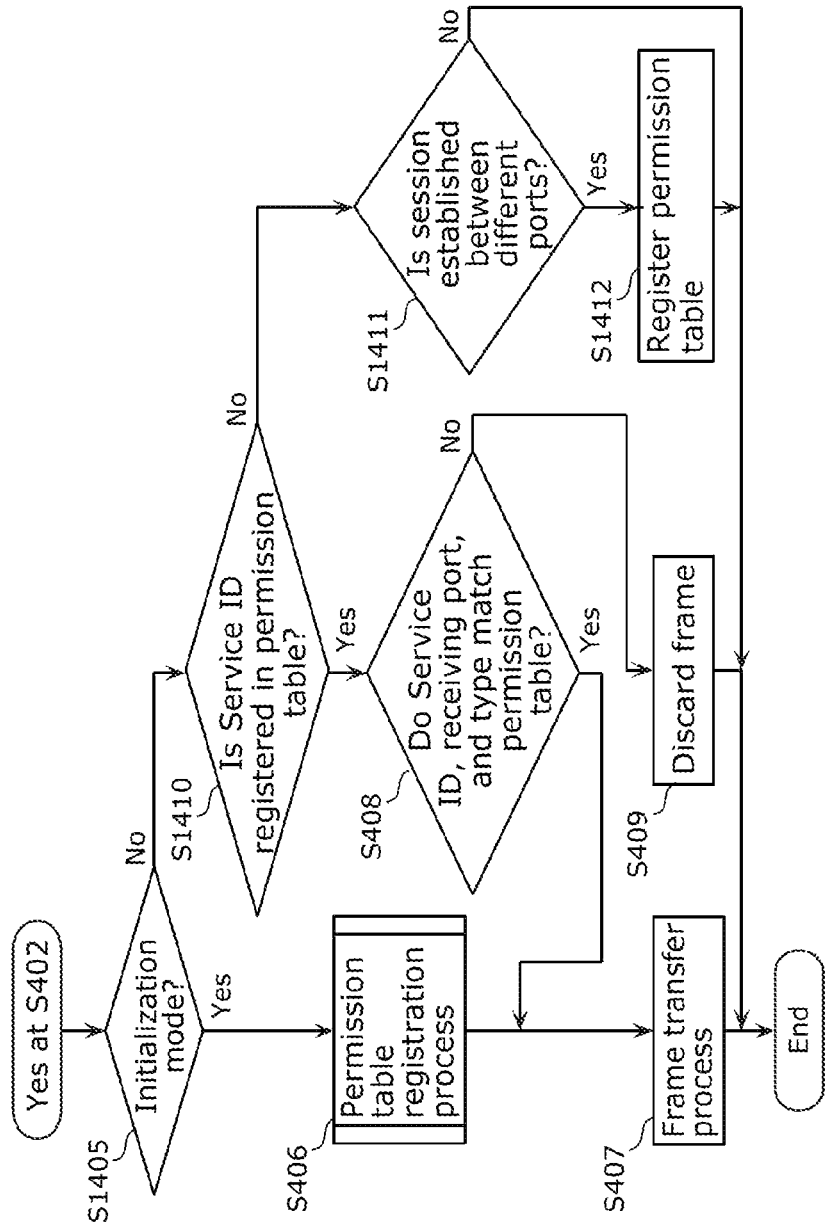
FIG. 14 is a flowchart of an overall process performed by a Zone ECU according to Other Variation (3).

FIG. 14 is a flowchart of an overall process performed by Zone ECU 100a according to Other Variation (3). FIG. 14 illustrates a process performed after the determination result of Yes is returned at step S402 of FIG. 12.

(Step S1405) Zone ECU 100a determines whether its mode is the initialization mode. If Zone ECU 100a is in the initialization mode (if Yes), Zone ECU 100a executes step S406 and then step S407. If Zone ECU 100a is not in the initialization mode (if No), Zone ECU 100a executes step S1410.

(Step S1410) Zone ECU 100a checks whether Service ID included in the received SOME/IP SD message is registered in any of the permission rules in permission table 116. If Service ID is registered (if Yes), Zone ECU 100a executes step S408. The process performed thereafter is similar to the process illustrated in FIG. 12, and thus the description thereof will be omitted. If Service ID is not registered (if No), Zone ECU 100a executes step S1411.

(Step S1411) Zone ECU 100a checks whether a session can be established between different ports for the received SOME/IP SD message. That a session can be established means that a Subscribe message of a client ECU and a Subscribe Ack message can be observed and that, in this case, the service having Service ID included in these messages is available. If a session has been established (if Yes), Zone ECU 100a executes S1412. If a session fails to be established (if No), Zone ECU 100a terminates the process at that point.

(Step S1412) Zone ECU 100a registers a permission rule pertaining to the stated Service ID into permission table 116.

(4) In the foregoing embodiment, a Zone ECU holds the mode, and the permission rule of SOME/IP SD is registered when the mode is the initialization mode. Alternatively, the Zone ECU does not need to hold the mode.

For example, each ECU may hold a manifest file (manifest information) in advance concerning the service that each ECU uses. Then, each ECU may transmit its manifest file to a Zone ECU, and the Zone ECU may update permission table 116 upon verifying the legitimacy of the manifest file. For example, host block 101 may be an example of a rule updater. If any communication port among the plurality of communication ports receives a frame that includes manifest information concerning the service that an ECU uses, the rule updater may update the permission rule based on the manifest information and the port information identifying the communication port via which the frame that includes the manifest information has been received.

This configuration renders it unnecessary to manage the mode and allows a permission rule to be registered into permission table 116 based on more reliable information, which leads to increased security and effectiveness.

FIG. 15 illustrates an example of a manifest file according to Other Variation (4).

The manifest file includes Service ID used by each ECU, the role of each ECU, and the use start condition. The role indicates whether the ECU is a server that offers the service or a client that receives the service, and the use start condition indicates the condition concerning the vehicle state in which SOME/IP SD communication occurs.

In the example illustrated in FIG. 15, the ECU that holds this manifest file is the server of the service whose Service ID is 0x1050, and the use start condition indicates that the communication occurs while the vehicle is stopped. Moreover, this ECU can also be a client of the service whose Service ID is 0x2050, and the use start condition indicates that the communication can occur at any time regardless of the vehicle state.

(5) In the foregoing embodiment, the vehicle state written in the permission rule is not used to detect an unauthorized frame. Alternatively, the vehicle state may be used to detect an unauthorized frame.

Figure 16:
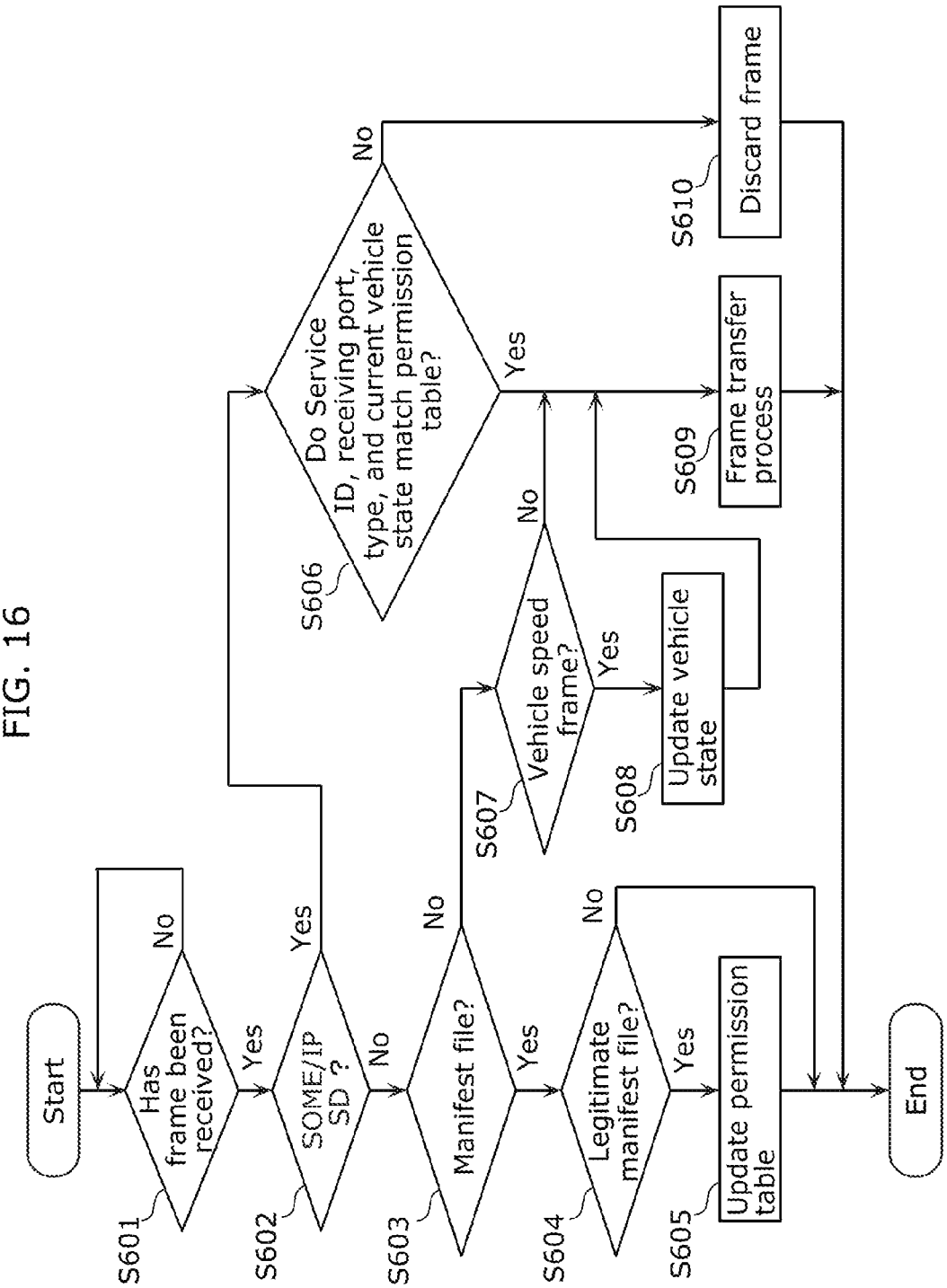
FIG. 16 is a flowchart of an overall process performed by a Zone ECU when Other Variation (4) and Variation (5) are combined.

FIG. 16 is a flowchart of an overall process performed by Zone ECU 100a when Other Variation (4) and Variation (5) are combined.

(Step S601) Zone ECU 100a checks whether Zone ECU 100a has received a frame. If Zone ECU 100a has received a frame (if Yes), Zone ECU 100a executes step S602. Meanwhile, if Zone ECU 100a does not receive a frame (If No), Zone ECU 100a executes step S601 until Zone ECU 100a receives a frame.

(Step S602) Zone ECU 100a checks whether the received frame is a SOME/IP SD message. If the received frame is not a SOME/IP SD message (if No), Zone ECU 100a executes step S603. Meanwhile, if the received frame is a SOME/IP SD message (if Yes), Zone ECU 100a executes step S606.

(Step S603) Zone ECU 100a checks whether Zone ECU 100a has received a frame that includes a manifest file. If Zone ECU 100a has received a frame that includes a manifest file (if Yes), Zone ECU 100a executes step S604. Meanwhile, if Zone ECU 100a does not receive a frame that includes a manifest file (if No), Zone ECU 100a executes step S607.

(Step S604) Zone ECU 100a checks whether the manifest file included in the received frame is legitimate. Zone ECU 100a can verify the legitimacy of the manifest file by verifying the message authentication code included in the manifest file or by verifying the electronic signature. If the manifest file is legitimate (if Yes), Zone ECU 100a executes step S605. Meanwhile, if the manifest file is not legitimate (if No), Zone ECU 100a terminates the process.

(Step S605) Zone ECU 100a updates the permission rule in permission table 116 in accordance with the manifest file. With regard to the communication port, Zone ECU 100a writes in the information of the port via which the frame that includes the manifest file has been received.

(Step S606) Zone ECU 100a checks whether Service ID, the receiving port, the type, and the current vehicle state in the received SOME/IP SD message match the permission rule stored in permission table 116. If Service ID, the receiving port, the type, and the current vehicle state in the received SOME/IP SD message match the permission rule (if Yes), Zone ECU 100a executes step S609. Meanwhile, if Service ID, the receiving port, the type, and the current vehicle state in the received SOME/IP SD message fail to match the permission rule (if No), Zone ECU 100a executes step S610.

(Step S607) Zone ECU 100a checks whether the received frame is a frame that includes vehicle speed information. If the received frame includes the vehicle speed information (if Yes), Zone ECU 100a executes step S608. Meanwhile, if the received frame does not include the vehicle speed information (if No), Zone ECU 100a executes step S609.

(Step S608) Zone ECU 100a updates the vehicle state based on the vehicle speed information included in the frame. Specifically, if the vehicle speed is 0 kilometers per hour, Zone ECU 100a updates the vehicle state to the stopped state. Meanwhile, if the vehicle speed is other than 0 kilometers per hour, Zone ECU 100a updates the vehicle state to the traveling state and executes step S609.

(Step S609) Zone ECU 100a transfers the received frame to an appropriate network and terminates the process.

(Step S610) Zone ECU 100a discards the received frame on the basis that the received frame is an unauthorized frame and terminates the process.

(6) In the example described in the foregoing embodiment, the manifest file is stored in plain text. Alternatively, the manifest file may be stored as an encrypted file. Moreover, the manifest file may include a certificate or a message authentication code for certifying its legitimacy.

(7) In the example described in the foregoing embodiment, a CAN or an Ethernet is used in a zone network. Alternatively, CAN-FD or FlexRay (registered trademark) may be used.

(8) In the example described in the foregoing embodiment, the Ethernet communication is carried out in plain text. Alternatively, encrypted communication, such as IPsec, MACset, or TLS, may be carried out.

(9) In the example described in the foregoing embodiment, all the networks are connected. Alternatively, the networks may be logically separated by Virtual LAN (VLAN). This configuration can help enhance the security and the effectiveness.

(10) In the foregoing embodiment, the vehicle state is not registered when permission table 116 is registered in the initialization mode. Alternatively, the vehicle state may be registered based on the current vehicle state. This configuration makes it possible to limit the timing at which the service of SOME/IP communication is used and to detect any offer of the service made at an unauthorized timing, which can help increase the effectiveness.

(11) In the foregoing embodiment, the initialization mode is entered only when the ignition is turned ON the first time. Alternatively, the condition that causes the initialization mode to be entered may be set separately. For example, such conditions where the initialization mode is entered upon the update of firmware or through a diagnosis command may be set. This configuration makes it possible to register a new permission rule at a timing when the service offering relationship changes, which can help increase the user-friendliness and the effectiveness.

(12) In the example described in the foregoing embodiment, if an unauthorized frame is detected (specifically, if the determination result indicating that the information included in a frame fails to match the permission rule is output), this unauthorized frame is kept from being transferred to another communication port. Alternatively, an unauthorized frame may be handled differently. For example, host block 101 of each ECU may be notified of the communication content of an unauthorized frame or of an occurrence of an unauthorized frame, another network may be notified to a similar effect, or a cloud server outside the vehicle may be notified to a similar effect. This configuration makes it possible to not only keep an unauthorized frame from taking control of the vehicle but also grasp the occurrence of any unauthorized situation, which is beneficial for handling the cause of an unauthorized situation. As another alternative, the port via which an unauthorized frame has been received may be disabled.

(13) In the example described in the foregoing embodiment, the configuration of a Zone ECU includes a switch. Alternatively, the switch may be independent from the Zone ECU and may filter any unauthorized frame. For example, the Zone ECU may be independent from the unauthorized frame detection device.

(14) In the example described in the foregoing embodiment, the vehicle state includes two states, namely the stopped state and the traveling state. The vehicle state, however, is not limited thereto. For example, a determination may be made on such vehicle states as "high-speed traveling", "charging", "automatic driving mode", or "firmware updating". In this manner, defining the vehicle state held when a service is offered more precisely makes it possible to increase the security level and can help increase the effectiveness.

(15) In the foregoing embodiment, permission table 116 is registered based on a SOME/IP SD message observed from when the ignition is turned ON the first time to when the ignition is turned OFF. Alternatively, the initialization mode may be repeated a predetermined number of times from when the ignition is turned ON the first time to when and even after the ignition is turned OFF. This configuration provides a possibility that the service that has not been used by the time when the ignition is turned OFF after the ignition has been turned ON the first time is observed in the second or subsequent instance of the initialization mode, which makes it possible to create a more accurate permission rule and can help increase the effectiveness.

(16) In the foregoing embodiment, a Zone ECU observes a SOME/IP SD message passively. Alternatively, the Zone ECU may itself transmit a Find message to find an available service. This configuration makes it possible to register an available service into permission table 116 while the Zone ECU is in the initialization mode and can help increase the effectiveness.

(17) In the example described in the foregoing embodiment, every SOME/IP SD message is determined whether it matches the permission rule. Alternatively, this determination may be made on some of the SOME/IP SD messages that include a certain service ID. For example, the above-described determination may be made only on the service concerning automatic driving. Specifically, a vehicle state determiner (e.g., host block 101) determines whether the state of the vehicle indicates that the vehicle is in the automatic driving mode. An unauthorized frame detector (e.g., host block 101 or communication controller 111) may determine whether the identifier of the service, the type of the service, the port information, and the state of the vehicle match the permission rule only if the identifier of the service indicates that the service pertains to automatic driving, and the permission rule may include a rule stating that the state of the vehicle is the automatic driving mode. This configuration allows only the service concerning the safety to be monitored and can reduce the amount of memory consumption, which can help increase the effectiveness.

(18) In the example described in the foregoing embodiment, only the communication that matches the permission rule is permitted. Alternatively, a prohibition rule may be stored, and the communication that matches the prohibition rule may be detected as being unauthorized.

(19) Each device in the foregoing embodiment is specifically a computer system that includes, for example, a microprocessor, a read only memory (ROM), a random access memory (RAM), a hard disk unit, a display unit, a keyboard, and a mouse. The RAM or the hard disk unit has a computer program recorded thereon. The microprocessor operates in accordance with the computer program, and thus each device implements its function. In this example, a computer program includes a plurality of sets of command codes providing instructions to a computer to implement a predetermined function.

(20) A part or the whole of the constituent elements included in each device according to the foregoing embodiment may be implemented by a single system large scale integration (LSI). A system LSI is an ultra-multifunctional LSI manufactured by integrating a plurality of components on a single chip and is specifically a computer system that includes, for example, a microprocessor, a ROM, and a RAM. The RAM has a computer program recorded thereon. The microprocessor operates in accordance with the computer program, and thus the system LSI implements its functions.

The constituent elements of each device described above may each be implemented by a single chip, or a part or the whole of such constituent elements may be implemented by a single chip.

Although the term a system LSI is used herein, depending on the difference in the degree of integration, it may also be called an IC, an LSI, a super LSI, or an ultra LSI. The technique for circuit integration is not limited to the LSI, and an integrated circuit may be implemented by a dedicated circuit or a general purpose processor. A field programmable gate array (FPGA) that can be programmed after an LSI is manufactured or a reconfigurable processor in which the connection or the setting of the circuit cells within the LSI can be reconfigured may also be used.

Furthermore, when a technique for circuit integration that replaces an LSI appears through the advancement in the semiconductor technology or through a derived different technique, the functional blocks may be integrated by use of such different techniques. An application of biotechnology is a possibility.

(21) A part or the whole of the constituent elements in each device described above may be implemented by an IC card or a single module that can be attached to or detached from each device. The IC card or the module is a computer system that includes, for example, a microprocessor, a ROM, and a RAM. The IC card or the module may include the ultra-multifunctional LSI described above. The microprocessor operates in accordance with a computer program, and thus the IC card or the module implements its functions. The IC card or the module may be tamper resistant.

(22) The present disclose can be implemented not only in the form of an unauthorized frame detection device but also as an unauthorized frame detection method that includes the steps (the processes) performed by the constituent elements of the unauthorized frame detection device.

An unauthorized frame detection method is an unauthorized frame detection method performed by an unauthorized frame detection device in an in-vehicle network system that includes a plurality of ECUs and a plurality of networks. The plurality of ECUs communicate via the unauthorized frame detection device through service-oriented communication. The unauthorized frame detection device includes a plurality of communication ports corresponding to the respective networks. The plurality of communication ports are each connected to a corresponding predetermined network among the plurality of networks and each include an interface for transmitting or receiving, via the predetermined network, a frame to or from an ECU, among the plurality of ECUs, that is connected to the predetermined network. The unauthorized frame detection method includes a transfer control step (step S407) and an unauthorized frame detecting step (step S408), as illustrated in FIG. 12. In the transfer controlling step, if a communication port among the plurality of communication ports receives a frame (Yes at step S401), transfer control is performed so as to cause the frame to be transmitted from a communication port other than the communication port that has received the frame among the plurality of communication ports. In the unauthorized frame detecting step, a determination is made as to whether an identifier of a service included in the frame, a type of the service included in the frame, and port information included in the frame match a permission rule set in advance, and a result of the determination is output. The type of the service indicates whether an ECU, among the plurality of ECUs, that has transmitted the frame is to offer the service or is to receive the service, and the port information serves to identify the communication port that has received the frame.

The steps in the unauthorized frame detection method may be executed by a computer (a computer system). Moreover, the present disclosure can be implemented in the form of a computer program that causes a computer to execute the steps included in the unauthorized frame detection method or in the form of digital signals composed of the computer program.

The present disclosure can be implemented in the form of a non-transitory computer readable recording medium having the aforementioned computer program or the aforementioned digital signals recorded thereon, and examples of such a non-transitory computer readable recording medium include a flexible disk, a hard disk, a CD-ROM, an MO, a DVD, a DVD-ROM, a DVD-RAM, a Blue-ray (BD) (registered trademark) disc, and a semiconductor memory.

According to the present disclosure, the computer program or the digital signals may be transmitted via an electric communication circuit, a wireless or wired communication circuit, a network represented by the internet, data broadcast, or the like.

The present disclosure may provide a computer system that includes a microprocessor and a memory. The memory may have the computer program described above recorded thereon, and the microprocessor may operate in accordance with the computer program.

Alternatively, the program or the digital signals may be recorded into a recording medium, which then may be transported, or the program or the digital signals may be transported via a network or the like. Thus, the program or the digital signals may be executed by a separate stand-alone computer system.

(23) The foregoing embodiment and the foregoing variations may be combined.

INDUSTRIAL APPLICABILITY

The present disclosure can find its use in an in-vehicle network system that uses service-oriented communication.

The invention claimed is:

1. An unauthorized frame detection device in an in-vehicle network system that includes a plurality of electronic control units and a plurality of networks, the plurality of electronic control units communicating via the unauthorized frame detection device through service-oriented communication, the unauthorized frame detection device comprising:
   a plurality of communication ports corresponding to the plurality of networks, respectively;
   a communication controller; and
   an unauthorized frame detector, wherein
   the plurality of communication ports are each connected to a predetermined network corresponding thereto among the plurality of networks and each include an interface for transmitting or receiving, via the predetermined network, a frame to or from an electronic control unit, among the plurality of electronic control units, that is connected to the predetermined network,
   when a communication port among the plurality of communication ports receives a frame, the communication controller performs transfer control of causing the frame to be transmitted from another communication port, among the plurality of communication ports, other than the communication port that has received the frame, and
   the unauthorized frame detector makes a determination as to whether an identifier of a service included in the frame, a type of the service included in the frame, and port information included in the frame match a permission rule set in advance and outputs a result of the determination, the type of the service indicating whether an electronic control unit, among the plurality of electronic units, that has transmitted the frame is to offer the service or receive the service, the port information serving to identify the communication port that has received the frame.

2. The unauthorized frame detection device according to claim 1, wherein
   when a communication port among the plurality of communication ports receives a frame and when the identifier of the service included in the frame, the type of the service included in the frame, and the port information included in the frame fail to match the permission rule, the communication controller refrains from performing the transfer control for the frame.

3. The unauthorized frame detection device according to claim 1, further comprising:
   a rule updater, wherein
   when a communication port among the plurality of communication ports receives a frame that includes manifest information concerning a service to be used by an electronic control unit among the plurality of electronic control units, the rule updater updates the permission rule based on the manifest information and port information identifying the communication port that has received the frame that includes the manifest information.

4. The unauthorized frame detection device according to claim 1, further comprising:
   a rule generator, wherein
   when the in-vehicle network system is started first time, the rule generator generates the permission rule based on the identifier of the service, the type of the service, and the port information that are each included in frames received by the plurality of communication ports.

5. The unauthorized frame detection device according to claim 1, wherein
   the service-oriented communication is Scalable Service Oriented Middleware over IP (SOME/IP), and
   the type of the service includes any one of Offer, Find, Subscribe, or Subscribe Ack.

6. The unauthorized frame detection device according to claim 1, further comprising a vehicle state determiner that determines a state of a vehicle provided with the in-vehicle network system based on a frame flowing over the plurality of networks.

7. The unauthorized frame detection device according to claim 6, wherein the unauthorized frame detector determines whether the identifier of the service, the type of the service, the port information, and the state of the vehicle match the permission rule.

8. The unauthorized frame detection device according to claim 7, wherein
   the vehicle state determiner determines whether the state of the vehicle indicates an automatic driving mode,
   the unauthorized frame detector determines whether the identifier of the service, the type of the service, the port information, and the state of the vehicle match the permission rule only when the identifier of the service indicates a service concerning automatic driving, and
   the permission rule includes a rule stating that the state of the vehicle indicates the automatic driving mode.

9. The unauthorized frame detection device according to claim 1, wherein the unauthorized frame detector determines whether the identifier of the service, the type of the service, the port information, and the state of a vehicle having the in-network vehicle system match the permission rule only if the identifier of the service in the frame indicates a service used in the predetermined state of the vehicle.

10. The unauthorized frame detection device according to claim 1, wherein
    a) the unauthorized frame detector receives an update request for updating a permission table storing the permission rule from one of the electronic control units,
    b) the unauthorized frame detector generates a random number seed in response to receiving update request and transmits the generated random number seed to the one of the electronic control units to check whether the received update request is a legitimate request,
    c) the one of the electronic control units calculates a response to receipt of the random number seed through a predetermined arithmetic operation using the received random number seed and a key held in key holder, and transmits the calculated response to the unauthorized frame detector, and
    d) the unauthorized frame detector verifies the calculated response when the calculated response is positive, determines that the update request is legitimate, and updates the permission table in accordance with the update request.

11. The unauthorized frame detection device according to claim 1, wherein the electronic control unit is configured:
    to determine whether the frame is received;
    to check whether the received frame is for SOME/IP SD communication;
    to check whether the received frame is a frame for updating a permission table storing the permission rule if the electronic control unit determines that the received frame is not for SOME/IP SD communication;
    to update the permission table if the electronic control unit determines that the received frame is a frame for updating a permission table and the received frame passes a challenge-response authentication;

to check whether the electronic control unit is in the initialization mode if the electronic control unit determines that the received frame is for SOME/IP SD communication;

to register the permission rule into the permission table based on the information included in the received SOME/IP SD communication if the electronic control unit is in the initialization mode;

to transfer the received SOME/IP SD communication to the another communication port if the permission rule is registered in the permission table;

to check whether the service identifier, the receiving port, and the service type in the received SOME/IP SD communication match the permission rule included in the permission table if the electronic control unit not in the initialization mode;

to transfer the received SOME/IP SD communication to the another communication port if the service identifier, the receiving port, and the service type in the received SOME/IP SD communication match the permission rule included in permission table; and to discard the received SOME/IP SD communication if the receiving port, and the service type in the received SOME/IP SD communication do not match the permission rule included in permission table.

12. The unauthorized frame detection device according to claim 1, wherein the electronic control unit is configured to:

to determine whether the frame is received;

to check whether the received frame is for SOME/IP SD communication;

to check whether the received frame includes a manifest file if the received frame is not for SOME/IP SD communication;

to check whether the manifest file included in the received frame is legitimate by verifying the message authentication code included in the manifest file or by verifying an electronic signature, if the received frame includes the manifest file;

to update the permission rule in the permission table in accordance with the manifest file if the manifest file is legitimate;

to check whether the service identifier, the receiving port, and the service type in the received SOME/IP SD communication match the permission rule included in the permission table if the received frame is for SOME/IP SD communication;

to check whether the received frame is a frame that includes vehicle speed information if the received frame does not include a manifest file;

to update the vehicle state based on the vehicle speed information included in the frame if the received frame is a frame that includes vehicle speed information;

to transfer the received frame to one of the plurality of networks if the vehicle state is updated or if the service identifier, the receiving port, and the service type in the received SOME/IP SD communication match the permission rule included in permission table; and to discard the received SOME/IP SD communication if the service identifier, the receiving port, and the service type in the received SOME/IP SD communication do not match the permission rule included in permission table.

13. An unauthorized frame detection method performed by an unauthorized frame detection device in an in-vehicle network system that includes a plurality of electronic control units and a plurality of networks, the plurality of electronic control units communicating via the unauthorized frame detection device through service-oriented communication, the unauthorized frame detection device including a plurality of communication ports corresponding to the plurality of networks, respectively, the plurality of communication ports each being connected to a predetermined network corresponding thereto among the plurality of networks and each including an interface for transmitting or receiving, via the predetermined network, a frame to or from an electronic control unit, among the plurality of electronic control units, that is connected to the predetermined network, the unauthorized frame detection method comprising:

performing transfer control, in response to a communication port among the plurality of communication ports receiving a frame, so as to cause the frame to be transmitted from another communication port, among the plurality of communication ports, other than the communication port that has received the frame; and making a determination as to whether an identifier of a service included in the frame, a type of the service included in the frame, and port information included in the frame match a permission rule set in advance and outputting a result of the determination, the type of the service indicating whether an electronic control unit, among the plurality of electronic control units, that has transmitted the frame is to offer the service or receive the service, the port information serving to identify the communication port that has received the frame.

14. The unauthorized frame detection method according to claim 13, further comprising determining with a vehicle state determiner a state of a vehicle provided with the in-vehicle network system based on a frame flowing over the plurality of networks.

15. The unauthorized frame detection method according to claim 13, wherein the unauthorized frame detector determines whether the identifier of the service, the type of the service, the port information, and the state of a vehicle having the in-network vehicle system match the permission rule only if the identifier of the service in the frame indicates a service used in the predetermined state of the vehicle.

16. The unauthorized frame detection method according to claim 13, wherein a) the unauthorized frame detector receives an update request for updating a permission table storing the permission rule from one of the electronic control units, b) the unauthorized frame detector generates a random number seed in response to receiving update request and transmits the generated random number seed to the one of the electronic control units to check whether the received update request is a legitimate request, c) the one of the electronic control units calculates a response to receipt of the random number seed through a predetermined arithmetic operation using the received random number seed and a key held in key holder, and transmits the calculated response to the unauthorized frame detector, and d) the unauthorized frame detector verifies the calculated response when the calculated response is positive, determines that the update request is legitimate, and updates the permission table in accordance with the update request.

17. The unauthorized frame detection method according to claim 13, wherein the electronic control unit is configured:
to determine whether the frame is received;
to check whether the received frame is for SOME/IP SD communication;
to check whether the received frame is a frame for updating a permission table storing the permission rule if the electronic control unit determines that the received frame is not for SOME/IP SD communication;
to update the permission table if the electronic control unit determines that the received frame is a frame for updating a permission table and the received frame passes a challenge-response authentication;
to check whether the electronic control unit is in the initialization mode if the electronic control unit determines that the received frame is for SOME/IP SD communication;
to register the permission rule into the permission table based on the information included in the received SOME/IP SD communication if the electronic control unit is in the initialization mode;
to transfer the received SOME/IP SD communication to the another communication port if the permission rule is registered in the permission table;
to check whether the service identifier, the receiving port, and the service type in the received SOME/IP SD communication match the permission rule included in the permission table if the electronic control unit not in the initialization mode;
to transfer the received SOME/IP SD communication to the another communication port if the service identifier, the receiving port, and the service type in the received SOME/IP SD communication match the permission rule included in permission table; and
to discard the received SOME/IP SD communication if the receiving port, and the service type in the received SOME/IP SD communication do not match the permission rule included in permission table.

18. The unauthorized frame detection method according to claim 13, wherein the electronic control unit is configured to:
to determine whether the frame is received;
to check whether the received frame is for SOME/IP SD communication;
to check whether the received frame includes a manifest file if the received frame is not for SOME/IP SD communication;
to check whether the manifest file included in the received frame is legitimate by verifying the message authentication code included in the manifest file or by verifying an electronic signature, if the received frame includes the manifest file;
to update the permission rule in the permission table in accordance with the manifest file if the manifest file is legitimate;
to check whether the service identifier, the receiving port, and the service type in the received SOME/IP SD communication match the permission rule included in the permission table if the received frame is for SOME/IP SD communication;
to check whether the received frame is a frame that includes vehicle speed information if the received frame does not include a manifest file;
to update the vehicle state based on the vehicle speed information included in the frame if the received frame is a frame that includes vehicle speed information;
to transfer the received frame to one of the plurality of networks if the vehicle state is updated or if the service identifier, the receiving port, and the service type in the received SOME/IP SD communication match the permission rule included in permission table; and
to discard the received SOME/IP SD communication if the service identifier, the receiving port, and the service type in the received SOME/IP SD communication do not match the permission rule included in permission table.

* * * * *